US010208152B2

(12) United States Patent
Nagasaki

(10) Patent No.: US 10,208,152 B2
(45) Date of Patent: Feb. 19, 2019

(54) POLY(ETHYLENE GLYCOL)-B-POLY(HALOMETHYLSTYRENE), DERIVATIVE THEREOF, AND METHOD FOR PRODUCING SAME

(71) Applicant: UNIVERSITY OF TSUKUBA, Ibaraki (JP)

(72) Inventor: Yukio Nagasaki, Ibaraki (JP)

(73) Assignee: UNIVERSITY OF TSUKUBA, Ibaraki (JP)

( * ) Notice: Subject to any disclaimer, the term of this patent is extended or adjusted under 35 U.S.C. 154(b) by 0 days.

(21) Appl. No.: 15/514,613

(22) PCT Filed: Sep. 29, 2015

(86) PCT No.: PCT/JP2015/077432
§ 371 (c)(1),
(2) Date: Mar. 27, 2017

(87) PCT Pub. No.: WO2016/052463
PCT Pub. Date: Apr. 7, 2016

(65) Prior Publication Data
US 2017/0247491 A1    Aug. 31, 2017

(30) Foreign Application Priority Data

Sep. 30, 2014  (JP) ................ 2014-201992

(51) Int. Cl.
*C08F 8/30*         (2006.01)
*C08F 12/16*        (2006.01)
(Continued)

(52) U.S. Cl.
CPC ............ *C08F 293/005* (2013.01); *C08F 8/30* (2013.01); *C08G 65/26* (2013.01); *C08F 12/16* (2013.01); *C08F 12/18* (2013.01); *C08F 2438/03* (2013.01)

(58) Field of Classification Search
CPC ........ C08F 293/005; C08F 8/30; C08F 12/16; C08F 12/18; C08F 2438/03; C08G 65/26
See application file for complete search history.

(56) References Cited

U.S. PATENT DOCUMENTS

2004/0171777 A1   9/2004  Le et al.
2008/0139764 A1   6/2008  Le et al.
(Continued)

FOREIGN PATENT DOCUMENTS

CN   103819390    5/2014
JP   2003-321524  11/2003
(Continued)

OTHER PUBLICATIONS

Extended European Search Report dated May 15, 2018 in corresponding European Patent Application No. 15848059.0.
(Continued)

*Primary Examiner* — Shane Fang
(74) *Attorney, Agent, or Firm* — Wenderoth, Lind & Ponack, L.L.P.

(57) ABSTRACT

A method for efficiently producing a poly(ethylene glycol)-b-poly(halomethylstyrene), a novel poly(ethylene glycol)-b-poly(halomethylstyrene) produced using the method, and a derivative thereof. The target novel copolymer can be provided by introducing a functional group, which enables reversible addition-fragmentation chain transfer (RAFT) polymerization, to the ω terminal of poly(ethylene glycol) and copolymerizing the resulting poly(ethylene glycol) with a halomethylstyrene.

4 Claims, 16 Drawing Sheets

(51) Int. Cl.
*C08F 12/18* (2006.01)
*C08G 65/26* (2006.01)
*C08F 293/00* (2006.01)

(56) References Cited

U.S. PATENT DOCUMENTS

| | | |
|---|---|---|
| 2008/0139836 A1 | 6/2008 | Le et al. |
| 2010/0315588 A1 | 12/2010 | Nunez et al. |
| 2011/0142787 A1 | 6/2011 | Nagasaki et al. |
| 2014/0356315 A1 | 12/2014 | Nagasaki et al. |
| 2016/0346438 A1 | 12/2016 | Nagasaki et al. |

FOREIGN PATENT DOCUMENTS

| | | |
|---|---|---|
| JP | 2012-111700 | 6/2012 |
| JP | 2012-530279 | 11/2012 |
| JP | 2014-1159 | 1/2014 |
| WO | 98/01478 | 1/1998 |
| WO | 2009/133647 | 11/2009 |
| WO | 2013/111801 | 8/2013 |
| WO | 2015/118993 | 8/2015 |

OTHER PUBLICATIONS

Toru Yoshitomi et al., "Design of Core-Shell-Type Nanoparticles Carrying Stable Radicals in the Core", Biomacromolecules, vol. 10, No. 3, Mar. 9, 2009, pp. 596-601.

International Search Report dated Dec. 22, 2015 in corresponding International (PCT) Application No. PCT/JP2015/077432.

Minami et al., "RAFT Polymerization in a Miniemulsion System Using a Novel Type of Amphiphilic RAFT Agent with Poly(ethylene glycol) Bound to a Dithiobenzoate Group", Macromolecules, vol. 47, No. 1, (2014), pp. 130-136.

Yoshitomi, "Synthesis of acetal-PEG/PCMS having reactive functional groups at both terminals, and applications and developments thereof", Abstracts from 2007 Materials Science Seminar, Sep. 27, 2007, with partial English translation.

[Fig. 1]
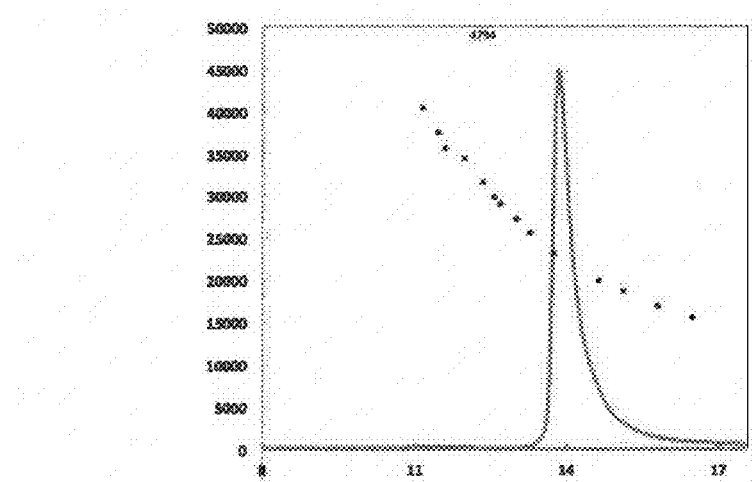
[Fig. 2]
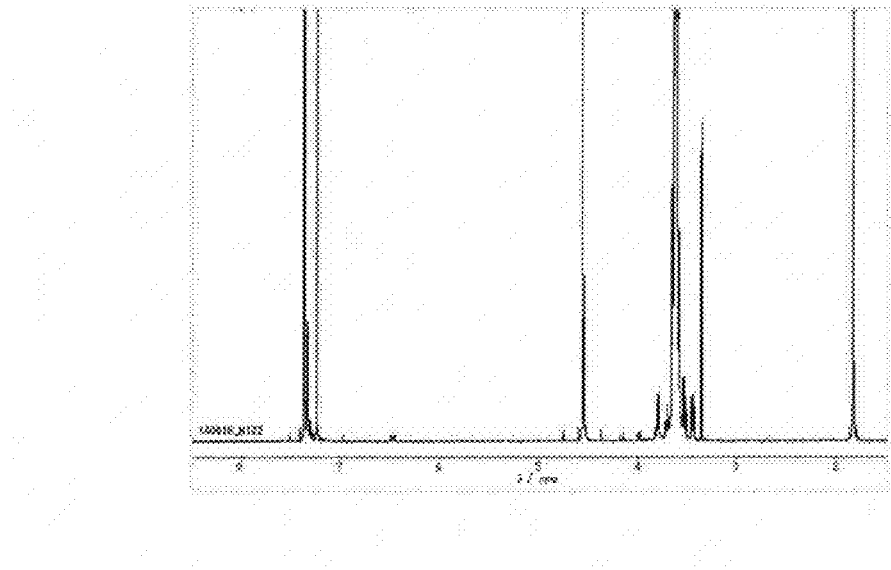

[Fig. 3]
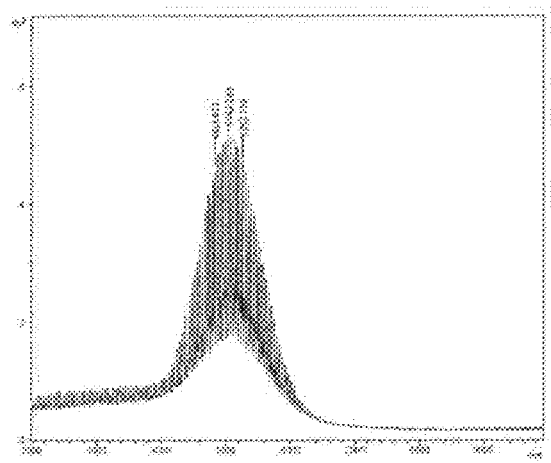
[Fig. 4]
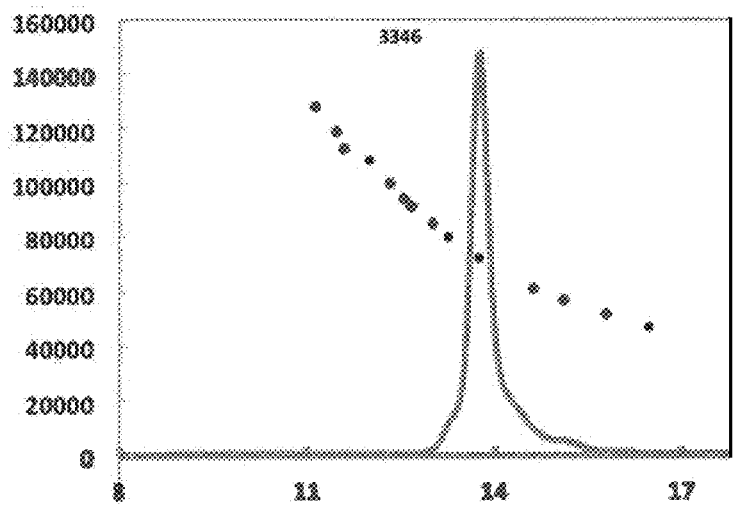

[Fig. 5]
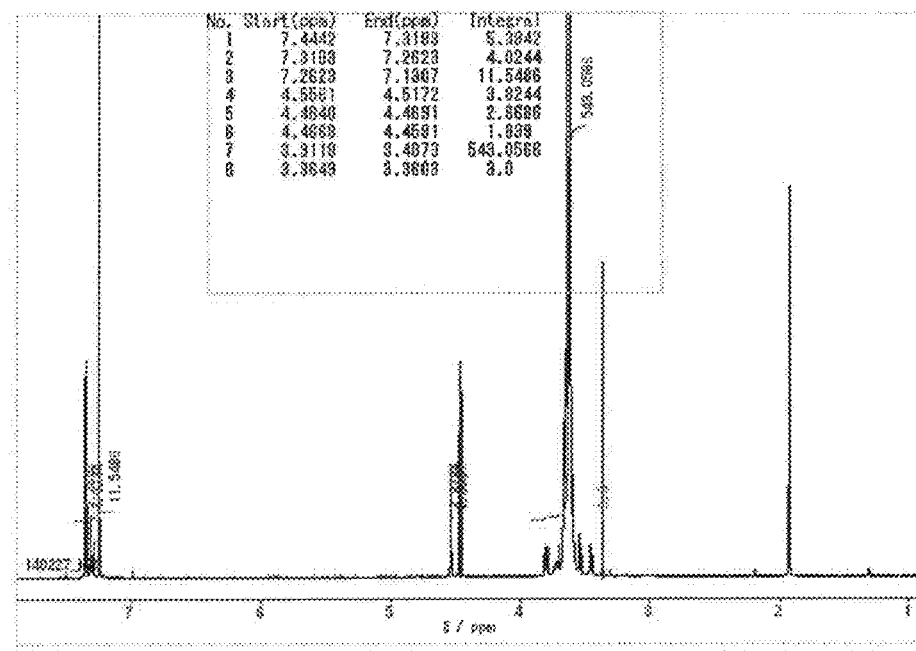
[Fig. 6]
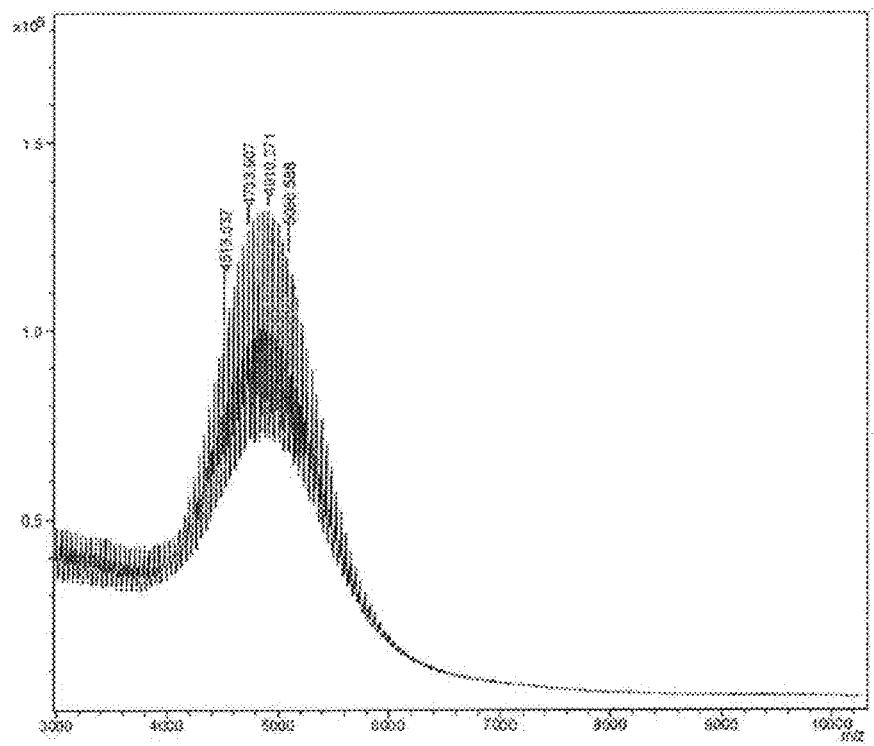

[Fig. 7]
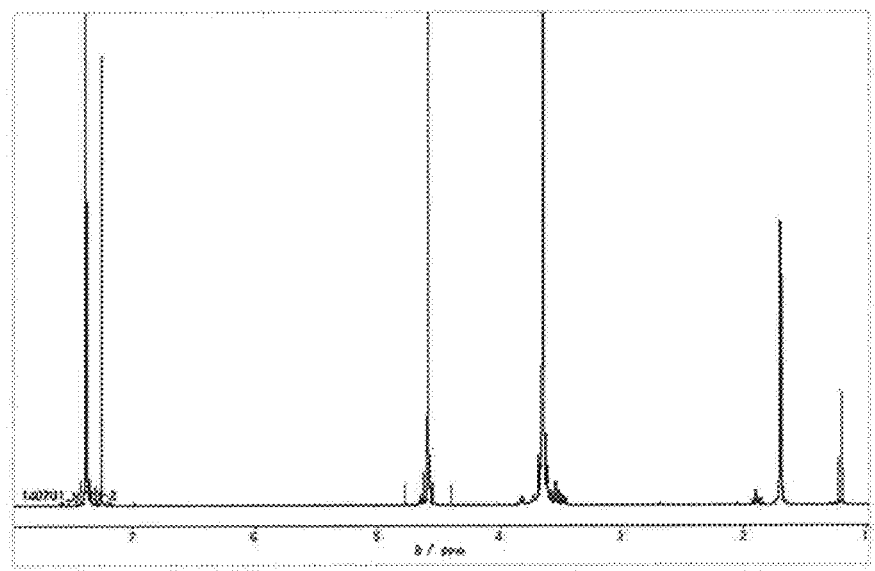
[Fig. 8]
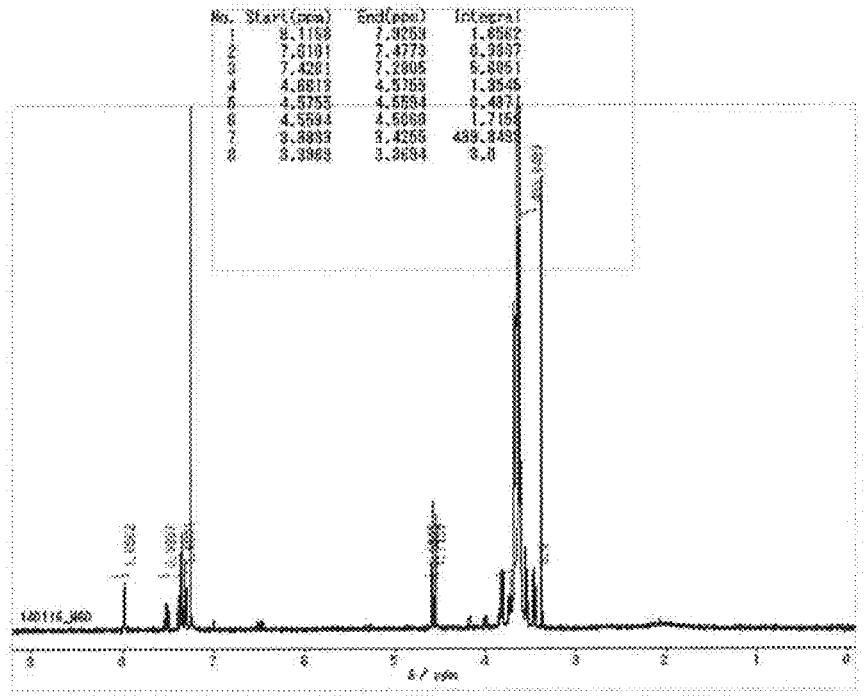

[Fig. 9]
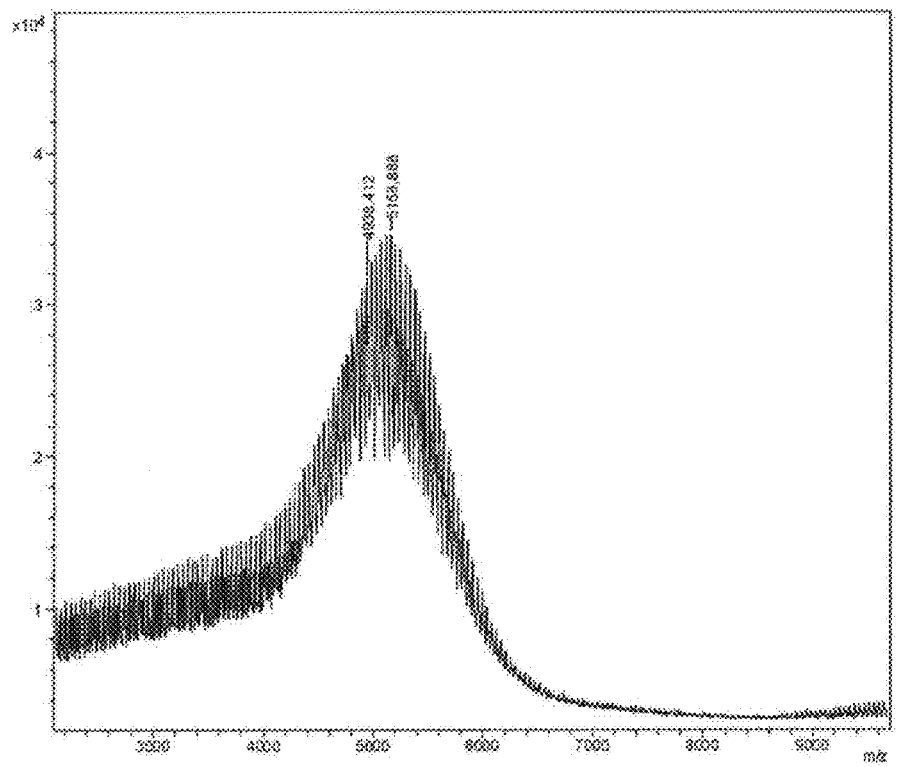
[Fig. 10]
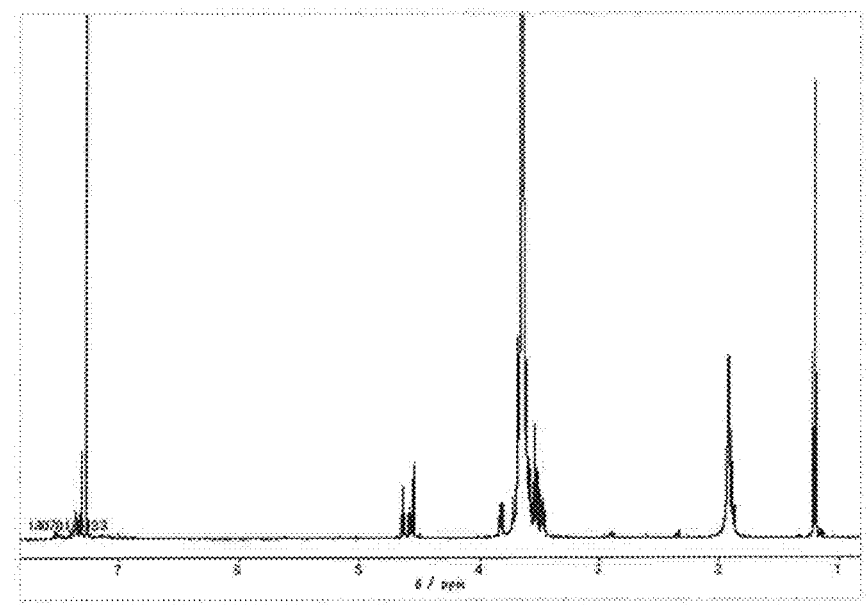

[Fig. 11]
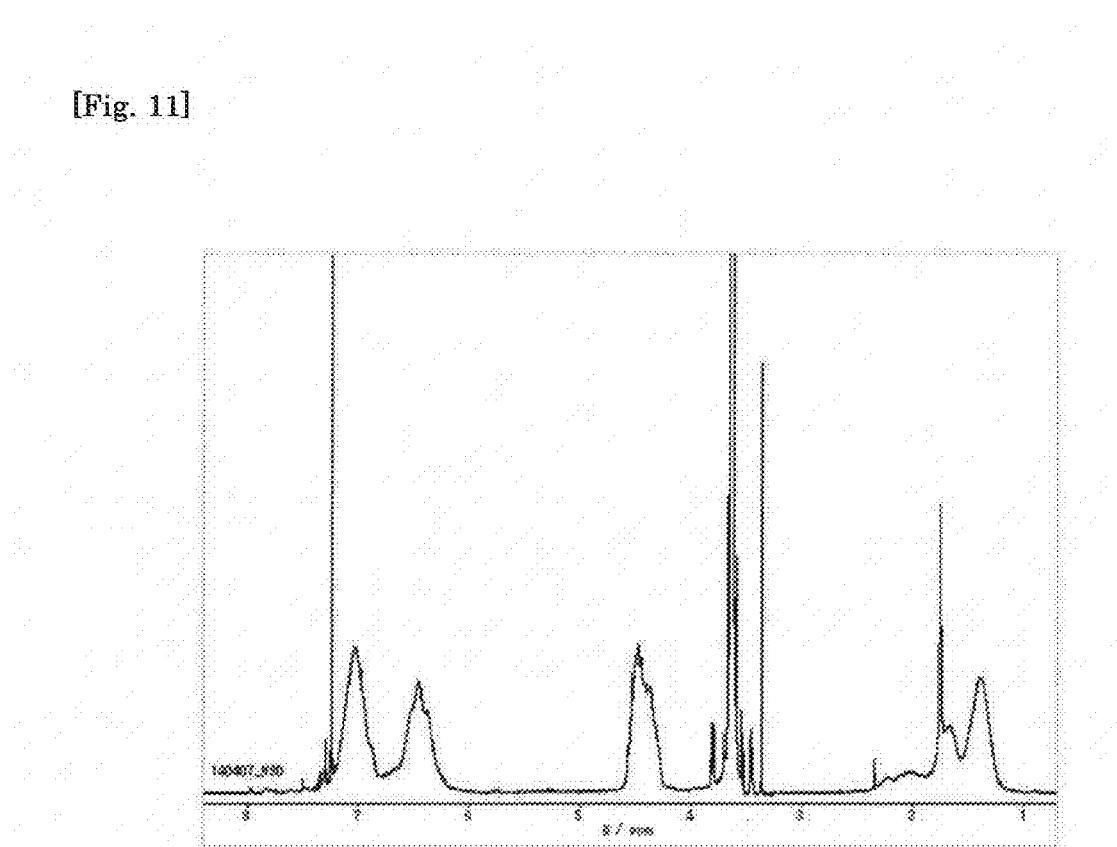
[Fig. 12]
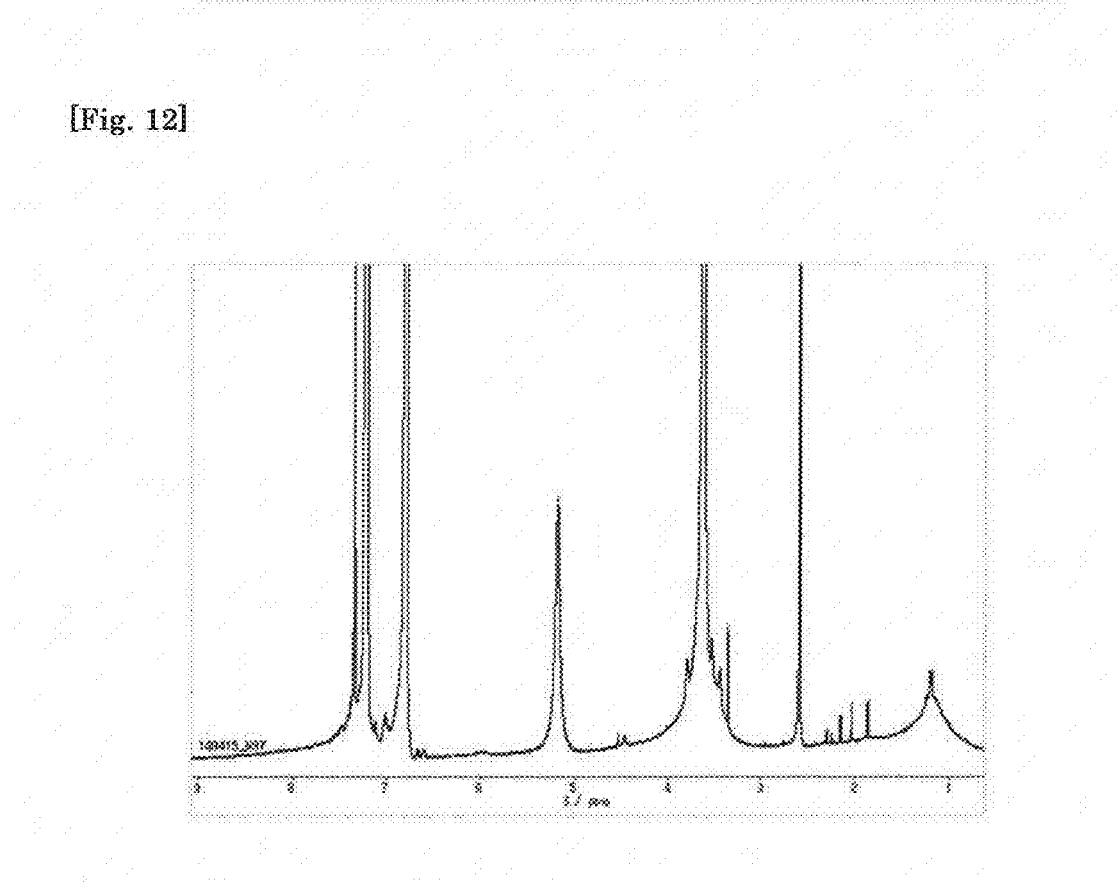

[Fig. 13]
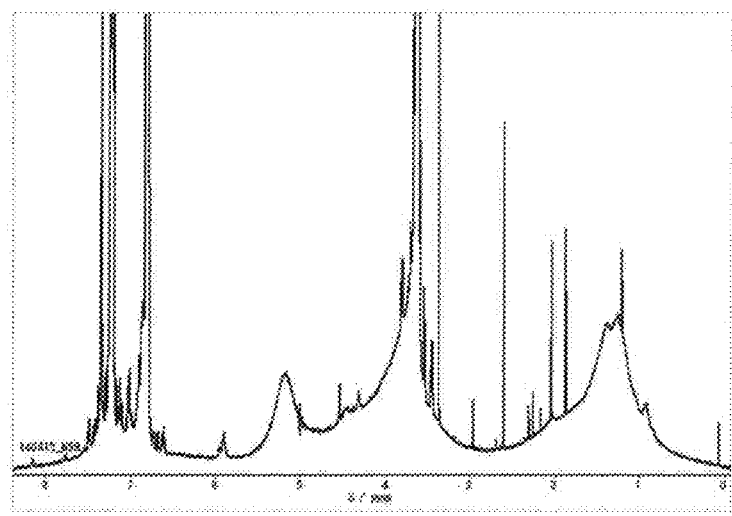
[Fig. 14]
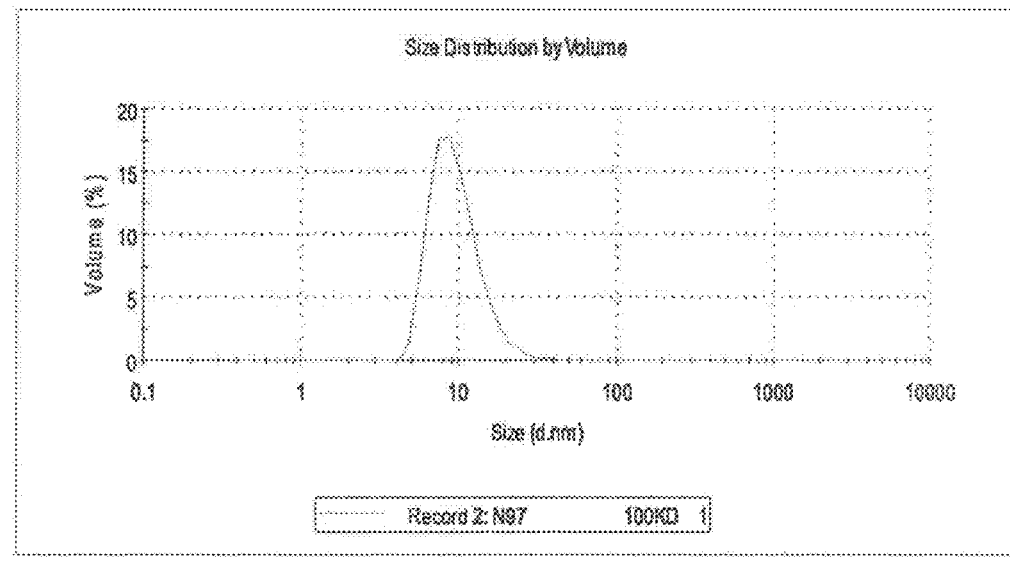

[Fig. 15]
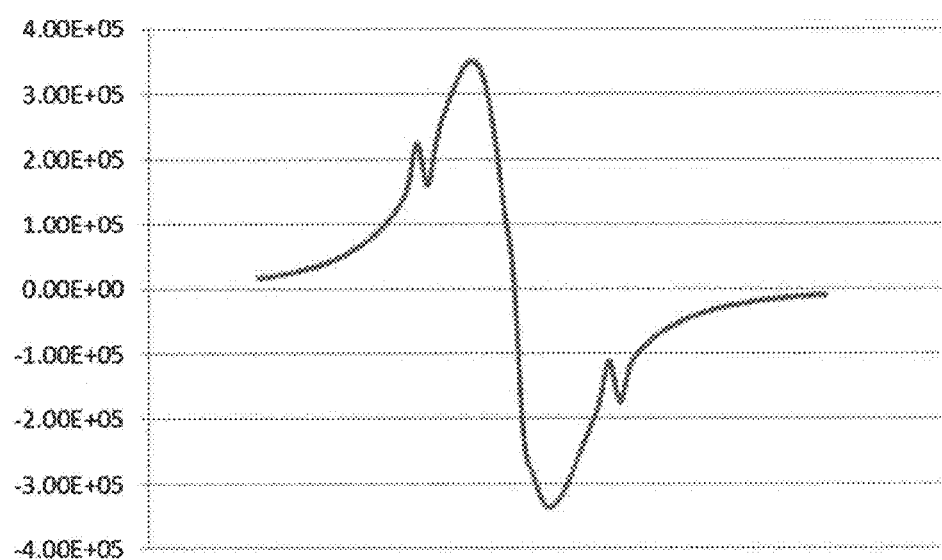

[Fig. 16]
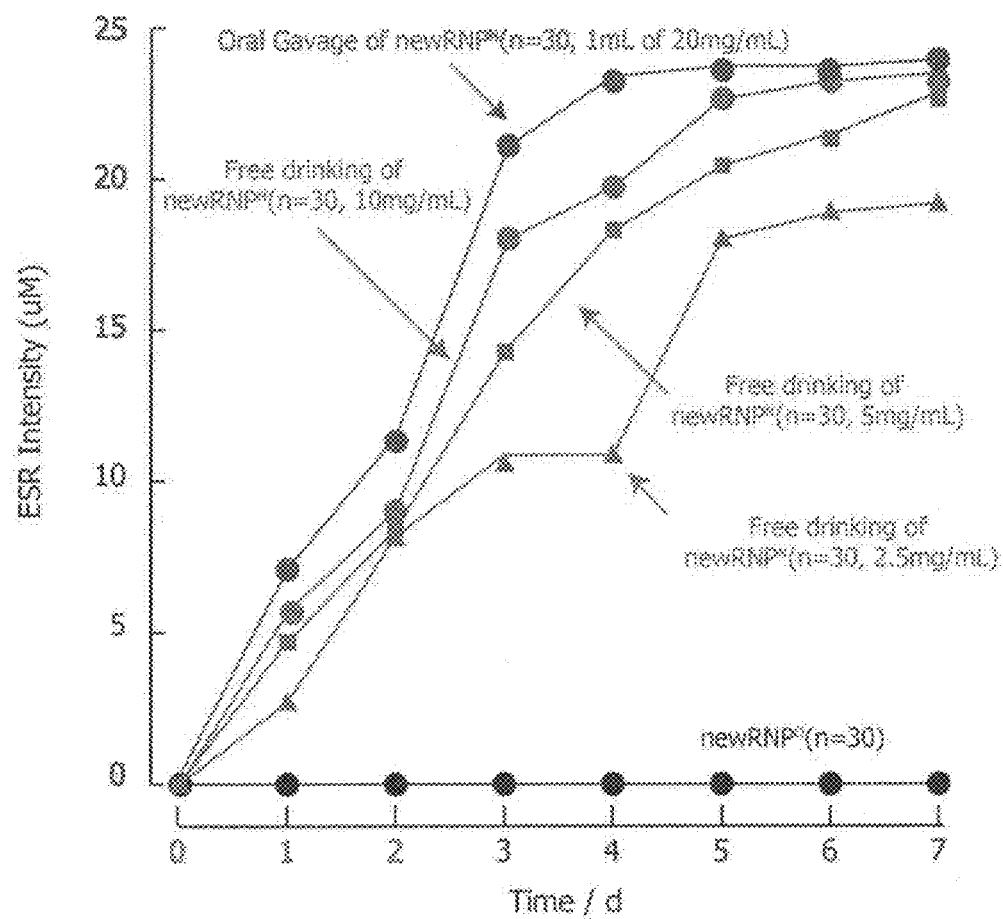

[Fig. 17]
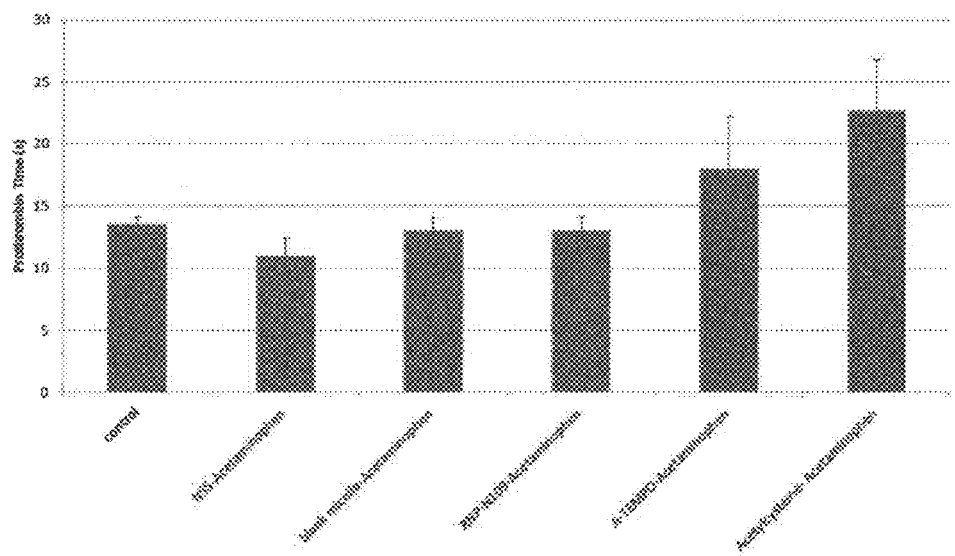
[Fig. 18]
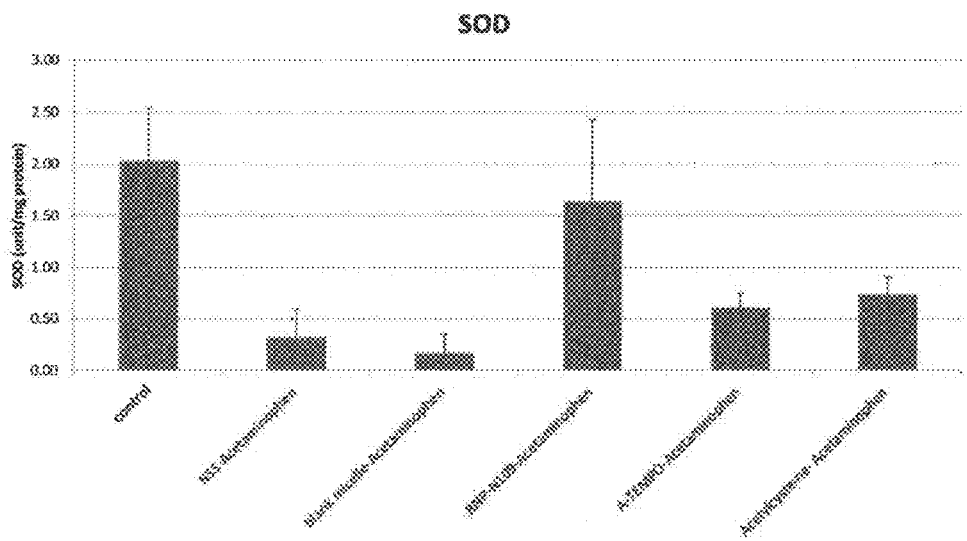

[Fig. 19]
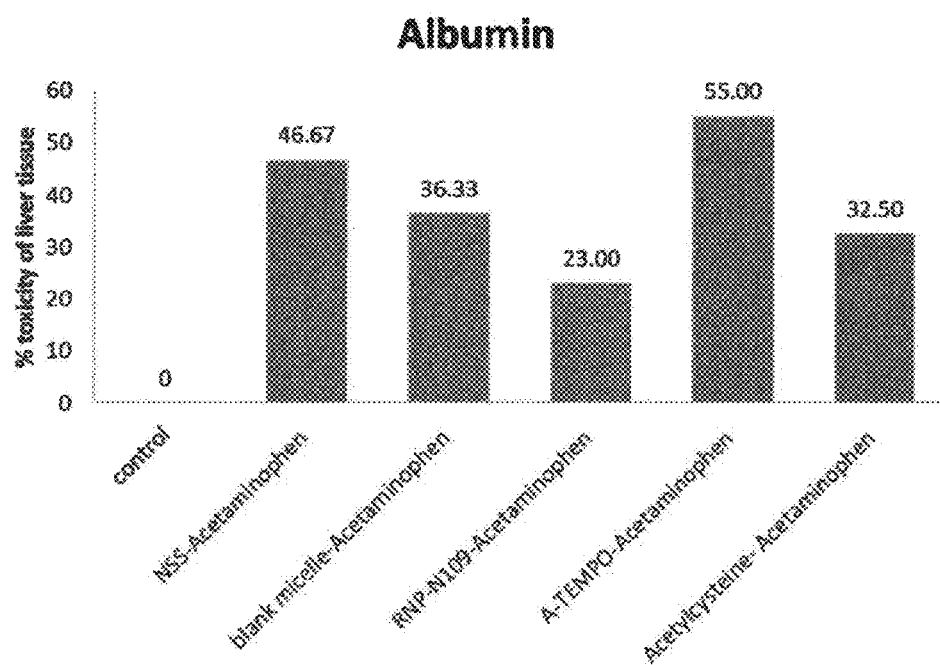

[Fig. 20]
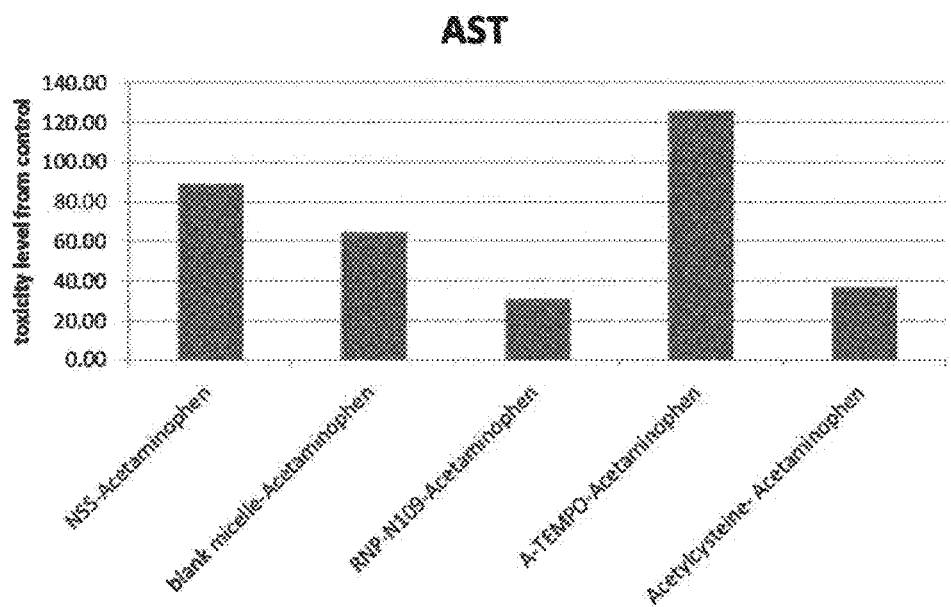
[Fig. 21]
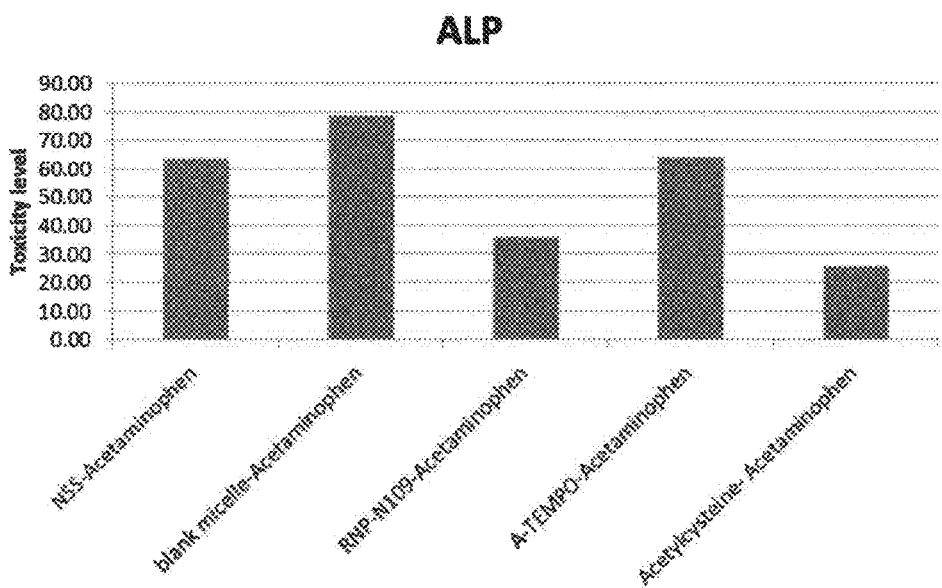

[Fig. 22]
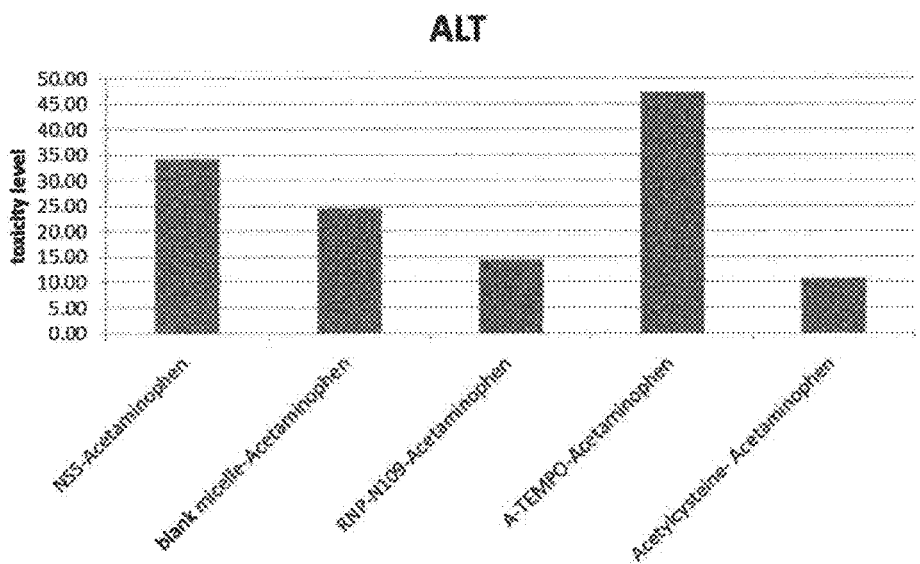
[Fig. 23]
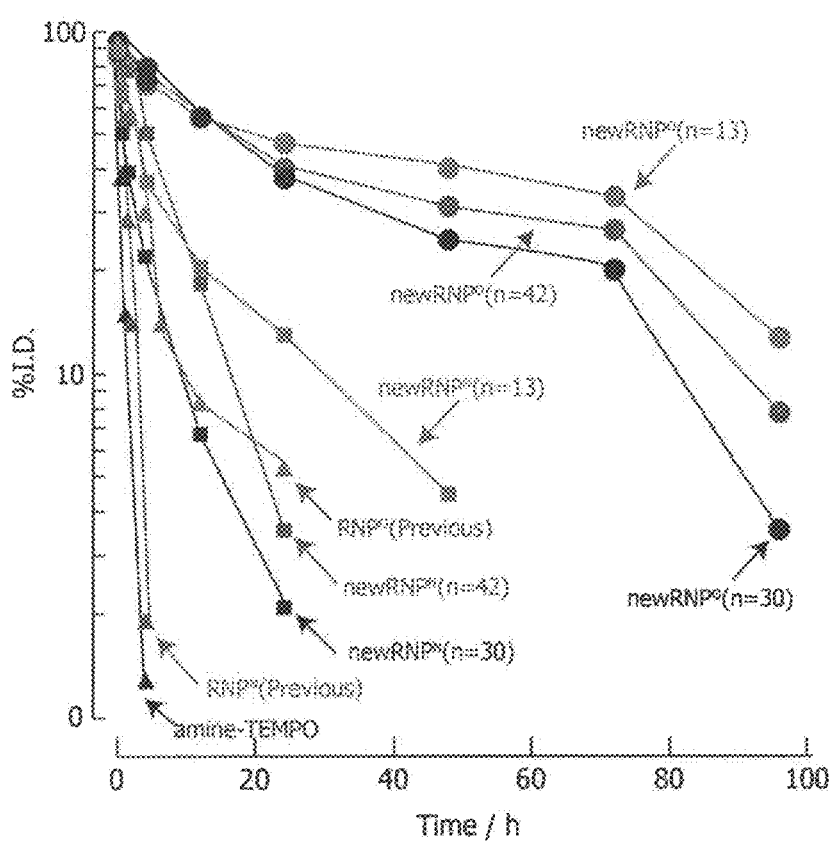

[Fig. 24]
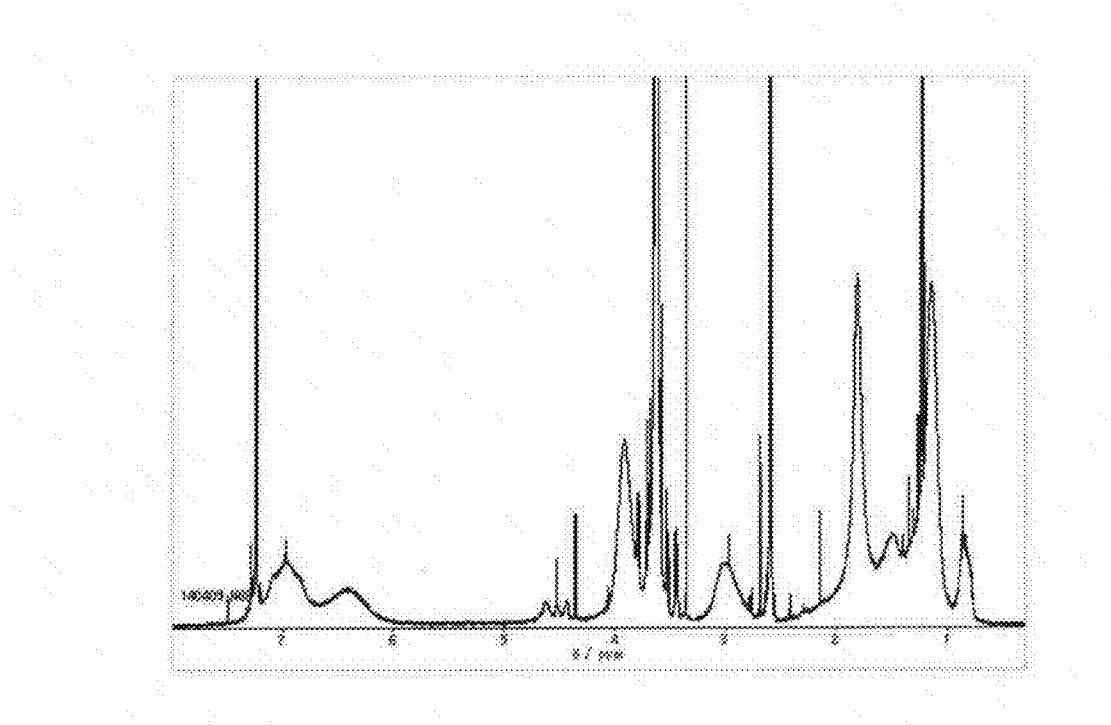
[Fig. 25]
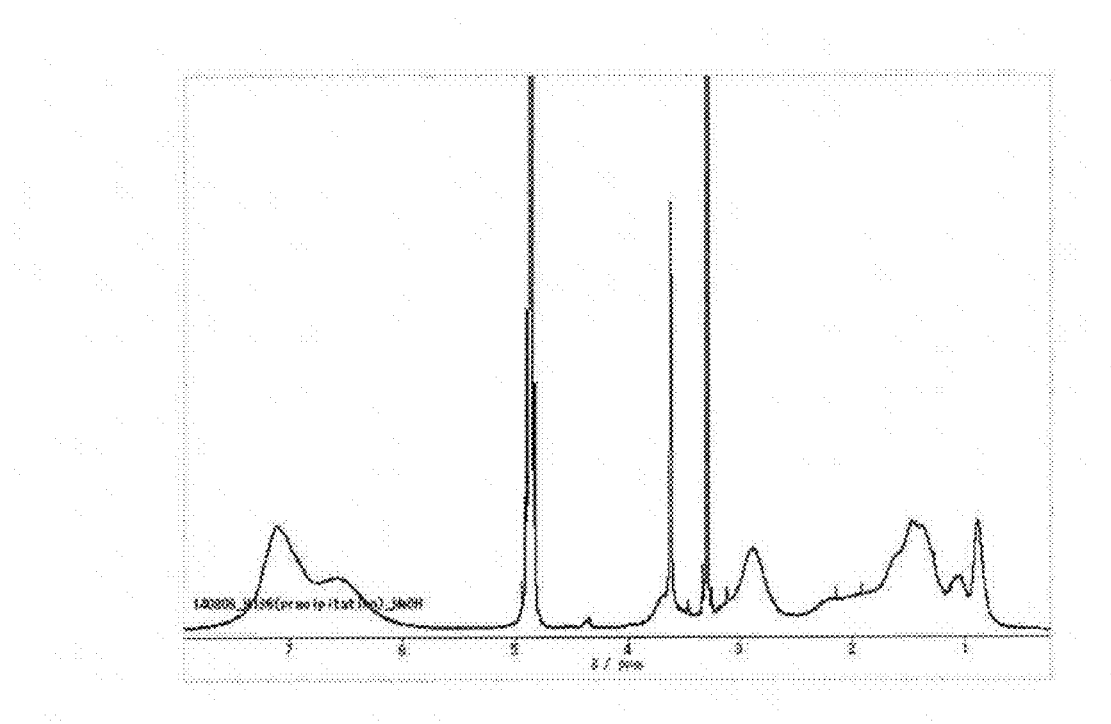

[Fig. 26]
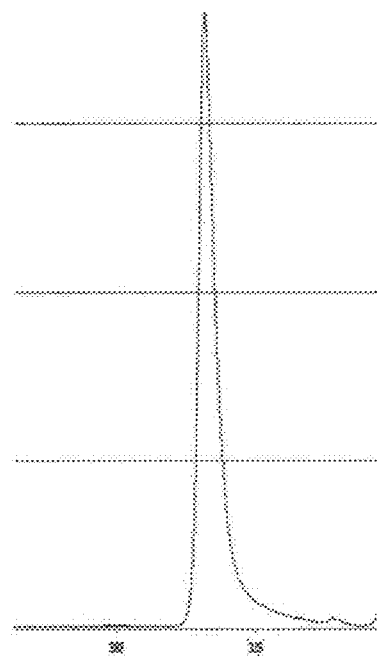
[Fig. 27]
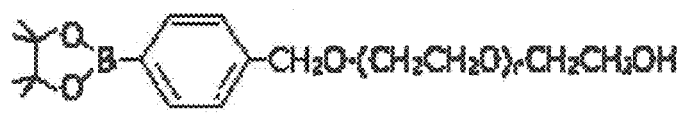
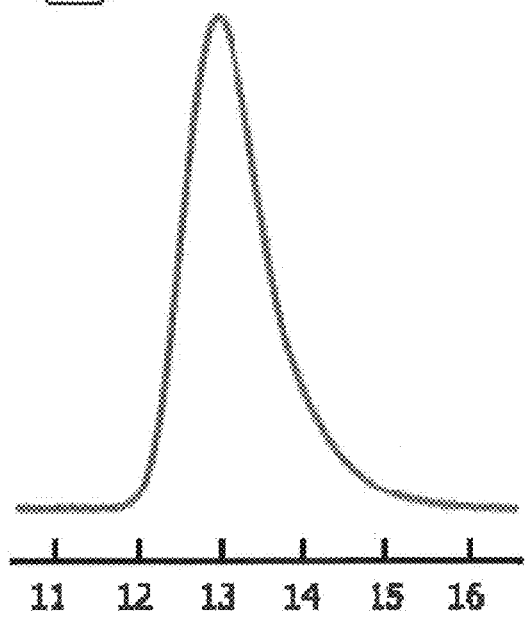

[Fig. 28]
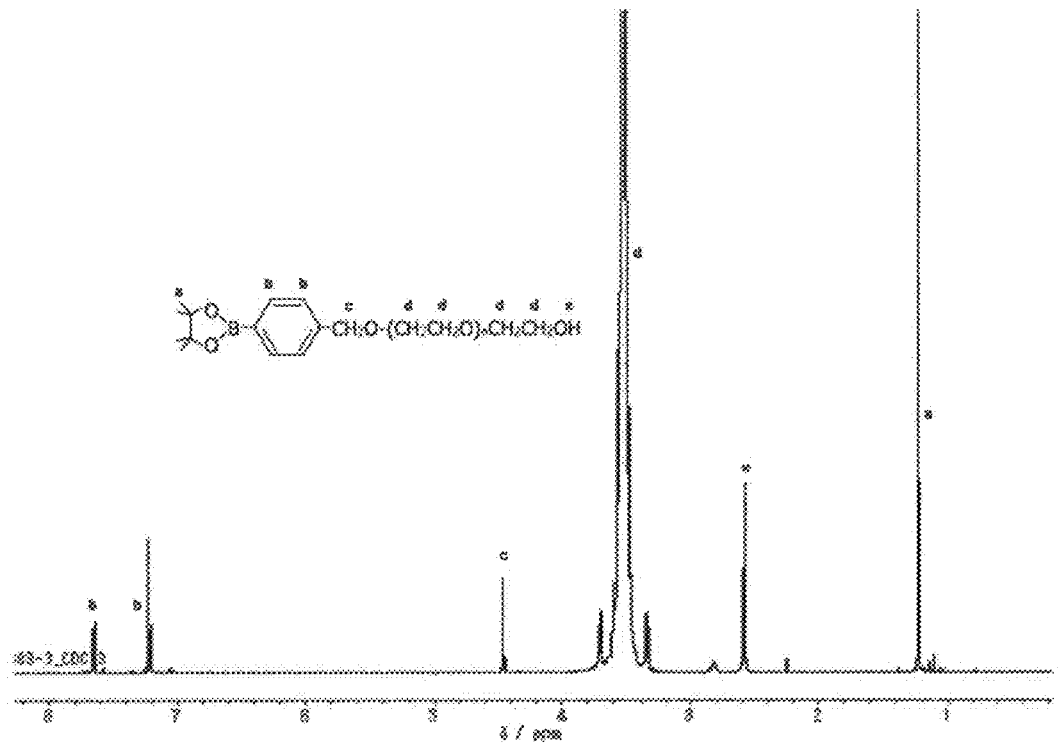
[Fig. 29]
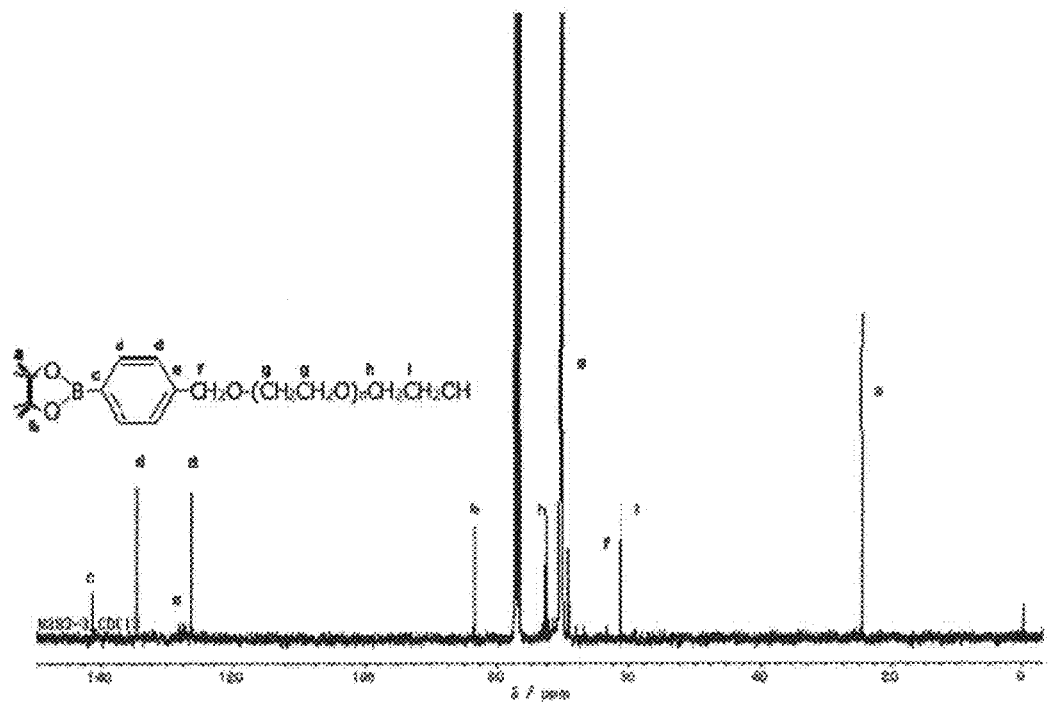

POLY(ETHYLENE GLYCOL)-B-POLY(HALOMETHYLSTYRENE), DERIVATIVE THEREOF, AND METHOD FOR PRODUCING SAME

TECHNICAL FIELD

In order to impart a variety of functions to poly(ethylene glycol) (PEG), which is widely used in a variety of physiological environments, a proposal has been made for a PEG-b-poly(chloromethylstyrene) (PEG/PCMS), which can be produced by introducing a SH group at a terminal of PEG and carrying out radical chain transfer polymerization (see Non-Patent Document 1). This block copolymer can be covalently bonded to a compound having an amino group, a hydroxyl group, or the like, via a chloromethyl group. For example, it has been confirmed that a block copolymer, which contains hydrophilic and hydrophobic segments in which cyclic nitroxide radicals are held by covalent bonding, forms nanoparticles in water through self-assembly, can stabilize cyclic nitroxide radicals, which are low molecular weight compounds, in physiological environments, and is suitable for a wide variety of intended uses, such as use in the medical field (for example, see Patent Document 1).

When using the production method mentioned above, however, recombination occurs during polymerization and contamination by triblock copolymers cannot be avoided (for example, see Preparation Example 1 in Patent Document 1), and such triblock copolymers not only cause a deterioration in functions such as retention in blood, but also have drawbacks such as involving complex reactions and high costs.

PRIOR ART DOCUMENT

Patent Document

Patent Document 1: Re-publication of PCT International Publication No. 2009/133647

Non-Patent Document

Non-Patent Document 1: Toru YOSHITOMI, Synthesis of acetal-PEG/PCMS having reactive functional groups at both terminals, and applications and developments thereof, Abstracts from 2007 Materials Science Seminar, Sep. 27, 2007

SUMMARY OF INVENTION

Technical Problem

For example, it has been suggested that the block copolymer derived from PEG/PCMS mentioned above, which contains hydrophilic and hydrophobic segments in which cyclic nitroxide radicals are held by covalent bonding and which contains 2,2,6,6-tetramethylpiperidine-1-oxyl as the nitroxide radical moiety, is useful against oxidative stress disorders such as reperfusion injuries following cerebral, cardiac or renal ischemia, cerebral hemorrhages, Alzheimer's Disease, cancer and ulcerative colitis. As a result, there is still a need to provide large quantities of a stable functional block copolymer which can impart such functions and which can be industrially commercialized more easily. The purpose of the present invention is to respond to this need.

Solution to Problem

It has been confirmed that by utilizing reversible addition-fragmentation chain transfer (RAFT) polymerization instead of producing a PEG/PCMS by introducing a SH group at a terminal of PEG and carrying out radical chain transfer polymerization, it is possible to produce a copolymer that imparts PEG with further functionality, which has a narrow molecular weight distribution, which is stable and which is particularly suitable for applications in the medical field.

Therefore, provided by the present invention is a method for producing, based on a reaction scheme below, a block copolymer represented by formula (I) or a block copolymer in which the phenyldithiocarbonyl group in formula (I), which may be substituted by $(R)_a$, is substituted by a hydrogen atom or a mercapto group, the method including a step of adding a styrene derivative represented by formula (7) to an inert solvent containing a polyethylene glycol) derivative represented by formula (6) and a radical reaction initiator and carrying out polymerization and, if necessary, a step of carrying out catalytic reduction or hydrolysis:

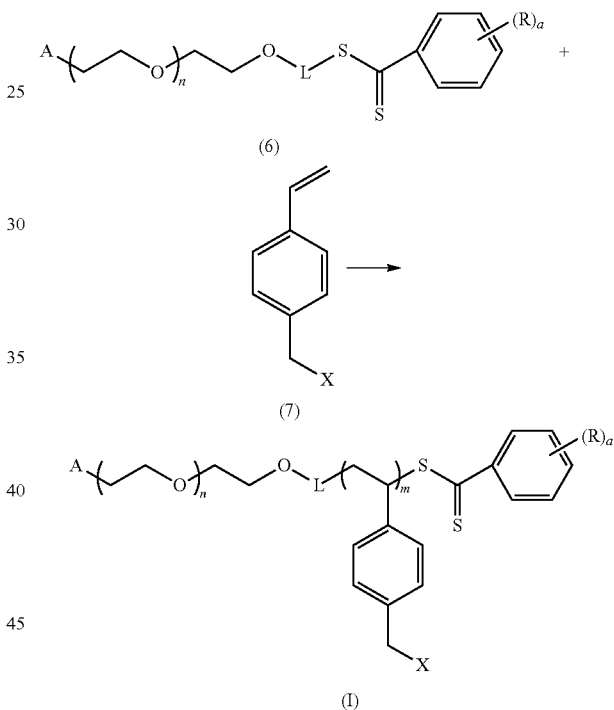

wherein,

A denotes an unsubstituted or substituted $C_1$-$C_{12}$ alkoxy group, with the substituent group being a formyl group or a group represented by the formula $R_1R_2CH$— in cases where A is substituted, $R_1$ and $R_2$ each independently denote a $C_1$-$C_4$ alkoxy group or $R_1$ and $R_2$ together denote a —OCH$_2$CH$_2$O— group, a —O(CH$_2$)$_3$O— group or a —O(CH$_2$)$_4$O— group, or in cases where A is substituted, the substituent group is a group represented by the formula $R_3R_4B$-Ph-, where $R_3$ and $R_4$ each denote a hydroxy group or $R_3$ and $R_4$ together denote a —OC(CH$_3$)$_2$C(CH$_3$)$_2$O— group, and Ph denotes an o-phenylene group, m-phenylene group or p-phenylene group that may be substituted by a methyl group or methoxy group, L is selected from groups represented by the formulae below:

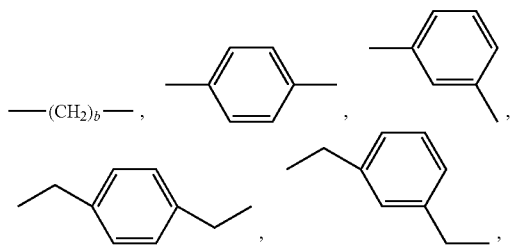

and is preferably a group represented by either of the last 2 formulae, b is an integer between 2 and 6, X denotes chlorine, bromine or iodine, R groups each independently denote a methyl group or methoxy group, a is an integer between 0 and 3, m is an integer between 3 and 500, and n is an integer between 2 and 10,000.

Also provided by the present invention is a block copolymer represented by formula (I) or a block copolymer in which the phenyldithiocarbonyl group in formula (I), which may be substituted by $(R)_a$, is substituted by a hydrogen atom or a mercapto group:

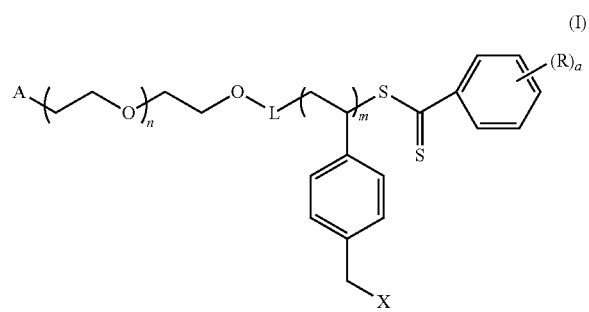

(I)

wherein, A, L, X, a, m and n are as defined above.

Also provided by the present invention is a block copolymer represented by formula (II) or a block copolymer in which the phenyldithiocarbonyl group in formula (II), which may be substituted by $(R)_a$, is substituted by a hydrogen atom:

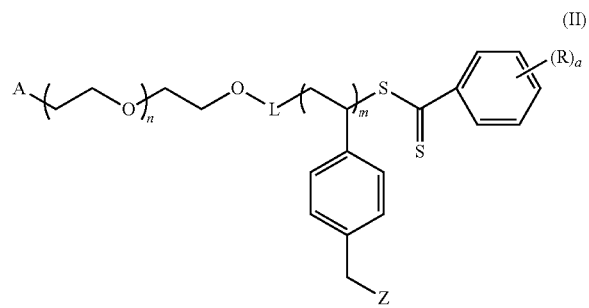

(II)

wherein, A, L, R, a, m and n are as defined above, Z is selected from groups represented by the formulae below, which are covalently bonded via a —NH— group or —O— group,

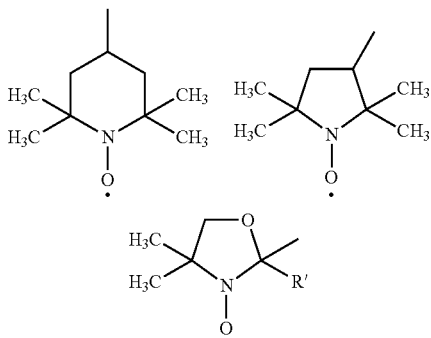

or denotes a —P(=O)(OCH$_2$CH$_3$)$_2$ group or —P(=O)(OH)$_2$ group, with these groups accounting for at least 60%, preferably at least 75%, more preferably at least 85%, and most preferably 100%, of the total number of Z groups, and the remaining Z groups, when present, being chlorine atoms, bromine atoms, iodine atoms or hydroxyl groups.

In addition, in cases where A denotes a substituted $C_1$-$C_{12}$ alkoxy group, with the substituent group being a group represented by the formula $R_3R_4B$-Ph-, $R_3$ and $R_4$ each denote a hydroxy group or together denote a —OC(CH$_3$)$_2$C(CH$_3$)$_2$O— group, and Ph denotes an o-phenylene group, m-phenylene group or p-phenylene group that may be substituted by a methyl group or methoxy group, a homopolymer represented by the following formula

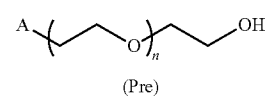

(Pre)

is, as far as the inventors of the present invention and the like are aware, a compound that has not been disclosed in prior art documents, and therefore provides a novel polymer. This type of homopolymer can also be used as a synthesis intermediate for the copolymer represented by formula (I) or formula (II), and the homopolymer per se can be used to modify medical products and the like.

According to the method for producing a block copolymer represented by formula (I) mentioned above, a unimodal block copolymer having a narrow molecular weight distribution can be efficiently obtained, which was not possible with the method disclosed in Patent Document 1. In addition, the halogen atom in the halogenated methyl group in the thus obtained block copolymer represented by formula (I) can be efficiently used for amination, hydroxylation, esterification, etherification or the like.

For example, a modified block copolymer represented by formula (II), which is obtained by this type of amination or etherification, is represented by the general formula (II) disclosed in Patent Document 1 and exhibits essentially the same biological activity as the "acetal-PEG-b-PCMS-N-TEMPO" disclosed in Preparation Example 2 in Patent Document 1 or the "methoxy-PEG-b-PCMS-O-TEMPO" disclosed in Preparation Example 3 in Patent Document 1. In addition, a modified block copolymer in which Z is represented by —P(=O)(OCH$_2$CH$_3$)$_2$ or —P(=O)(OH)$_2$ is useful for surface modification of, for example, a metal oxide, stainless steel or a polycation.

DESCRIPTION OF EMBODIMENTS

The radical initiator that is used in the method for producing a block copolymer represented by formula (I) can be azobisisobutyronitrile (AIBN), benzoyl peroxide, or the like, the inert solvent can be toluene, xylene, tetrahydrofuran (THF), benzene, or the like, and the reaction can be carried out under conditions ordinarily used to polymerize styrene. The optimal reaction temperature varies according to the solvent being used, but is between room temperature and the boiling point, the reaction duration is a factor that enables the molecular weight derived from the styrene derivative to be controlled to a certain extent by selecting the ratio of the usage quantity of the styrene derivative represented by formula (7) relative to the usage quantity of the PEG and selecting the reaction temperature and reaction duration, but the reaction duration can generally be between several hours (2 or 3 hours) and 20 hours. Isolation or purification of the product should be carried out by repeating, as necessary, a procedure involving introducing the reaction mixture liquid into a solvent which is a good solvent for unreacted raw materials or the like but which is a poor solvent for the product (1) so as to cause precipitation.

A compound represented by formula (6) is not limited, but can be efficiently obtained from a reaction between a compound represented by formula (4)

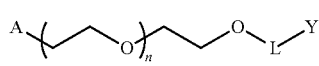

(4)

and a compound represented by formula (5).

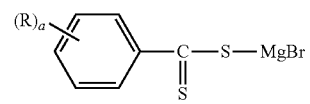

(5)

In the formulae above, Y can be a chlorine, bromine or iodine atom, and A, L, R, a and n are as defined above. This reaction can be completed by reacting the compound represented by formula (4) and the compound represented by formula (5) at a molar ratio of 0.1 to 10 to 0.1 in an ether solvent such as tetrahydrofuran (THF) or dioxane at a temperature of 5° C. to 50° C. for a duration of 12 to 24 hours. The compound represented by formula (5) can be produced by reacting carbon disulfide and bromophenyl magnesium at a molar ratio of 0.1 to 10:10 to 0.1 in a similar solvent at room temperature for a duration of 0.1 to 5 hours.

Furthermore, the compound represented by formula (4) can be obtained by reacting the polyethylene glycol) represented by formula (1), which has a group A at one terminal, with a Y-L-Y dihalide represented by formula (3) (the Y groups are each as defined above) in the presence of butyl lithium. For typical reaction conditions, see Examples 1 to 3 described below.

Therefore, according to the present invention, a block copolymer represented by formula (I) is not limited, but can be produced most efficiently by carrying out the following reaction scheme series.

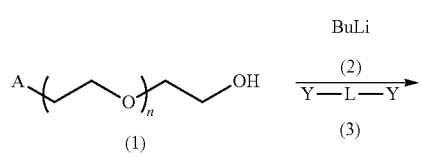

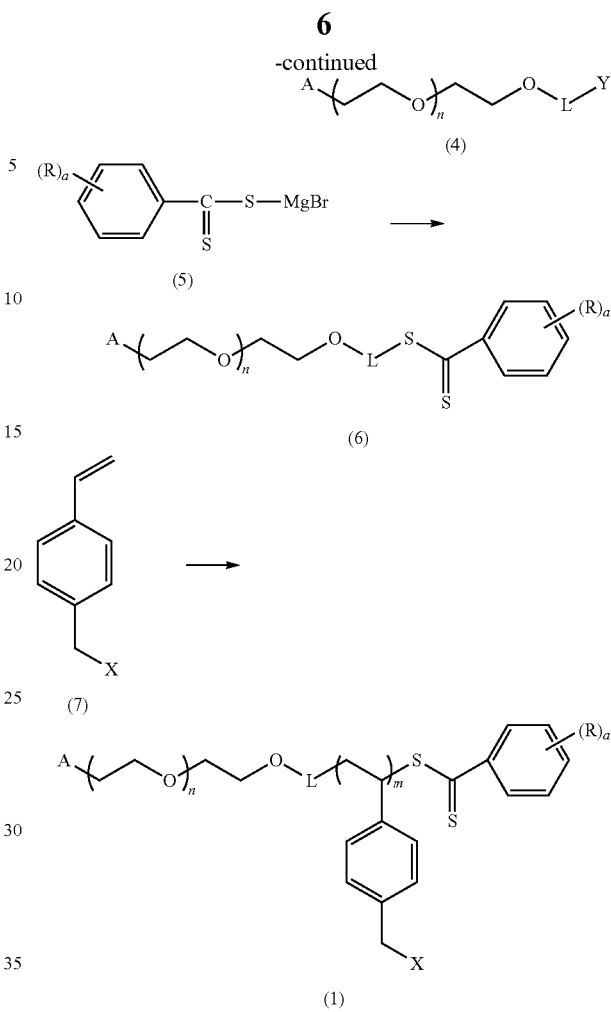

The steps above can be carried out under the conditions mentioned above according to the methods described in the working examples given below and methods obtained by modifying these methods by methods that are well known in this technical field.

Among thus obtained block copolymers represented by formula (I), a block copolymer represented by formula (I-a) is preferred:

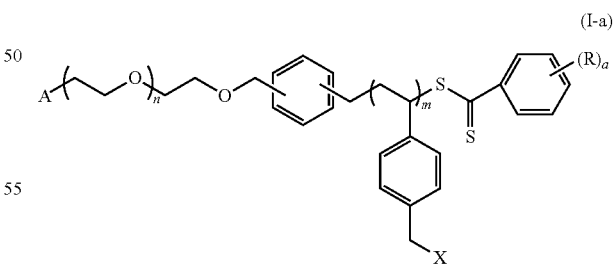

(I-a)

wherein, A, R, a, m and n are as defined above, X is preferably a chlorine atom or bromine atom, and more preferably a chlorine atom, m is preferably an integer between 3 and 250, more preferably an integer between 5 and 150, and particularly preferably an integer between 8 and 100, n is generally an integer between 2 and 10,000, preferably an integer between 12 and 5000, more preferably an integer between 14 and 1000, and particularly preferably an integer between 20 and 1000, a is preferably 0 or 1, with R preferably being a methyl in cases where a is 1, and a is more preferably 0. In addition, the xylylene moiety in the main chain is m-xylylene or p-xylylene, and preferably p-xylylene.

In the block copolymer represented by formula (I) or formula (I-a), the halomethyl group in the repeating unit derived from the styrene derivative (monomer) can be used in a desired amination reaction, etherification reaction or esterification reaction, as mentioned above, and a specific example of this type of mode of use is a compound represented by formula (II), as mentioned above.

A preferred block copolymer represented by formula (II) or block copolymer in which the phenyldithiocarbonyl group in formula (II), which may be substituted by $(R)_a$, is substituted by a hydrogen atom is a modified block copolymer represented by formula (II-a):

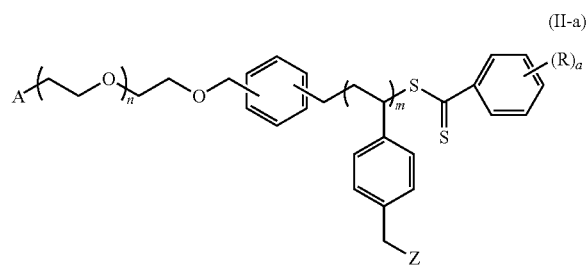

(II-a)

wherein, A, R, a, m and n are as defined above, including preferred modes, Z is selected from groups represented by the formulae below, which are covalently bonded via a —NH— group or —O— group,

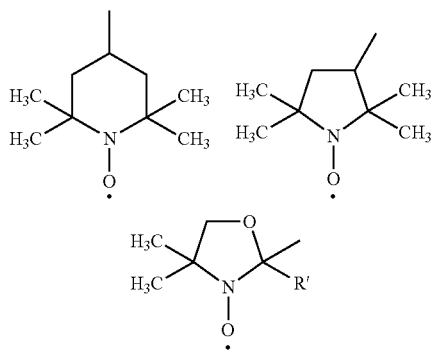

or denotes a —P(=O)(OCH$_2$CH$_3$)$_2$ group or —P(=O)(OH)$_2$ group. The copolymers in these modes can be produced particularly easily and exhibit constant stable properties.

This type of copolymer can be obtained in accordance with, for example, the method disclosed in Preparation Example 2 or Preparation Example 3 in Patent Document 1 by carrying out a reaction between the block copolymer represented by formula (I) or formula (I-a) and a cyclic nitroxide radical compound having an amino group or hydroxyl group or by carrying out a reaction with a lithium compound or sodium compound of diethyl phosphite (diethyl phosphonate).

In addition, the dithioester moiety that appears at the co terminal of the modified block copolymer represented by formula (II) or formula (II-a) can, in some cases be automatically converted into a mercapto group through hydrolysis while the reaction is progressing, but can, if necessary, be converted into a mercapto group or a hydrogen atom by actively carrying out hydrolysis or catalytic reduction.

In the block copolymers represented by formula (I), formula (I-a), formula (II) and formula (II-a), molecular assemblies or self-assembling polymer micelles are formed by molecules aggregating in an aqueous medium (a solvent system that contains water or, if necessary, a water-soluble organic solvent). Therefore, these characteristics can be utilized to establish DDSs for a variety of drugs.

The homopolymer represented by formula (Pre) is thought to be a novel compound, as mentioned above, but can be conveniently produced according to the method disclosed in Example 27, and the thus obtained homopolymer corresponds to the polymer of (1) above, and the block copolymer represented by formula (I) and the modified block copolymer represented by formula (II) can be obtained in accordance with the reaction schemes described above, starting with the polymer of (1) and then progressing via the polymer (4) and the polymer (6). A polymer or copolymer in which A denotes a substituted $C_1$-$C_{12}$ alkoxy group, with the substituent group being a group represented by formula $R_3R_4B$-Ph-, and $R_3$ and $R_4$ each denote a hydroxy group can be provided from a polymer or copolymer in which $R_3$ and $R_4$ together denotes a group represented by —OC(CH$_3$)$_2$C(CH$_3$)$_2$O— by hydrolyzing these pinacol esters in accordance with, for example, the method disclosed in J. Sun et al., J. Org. Chem. 2011, 76 (9), pages 3571 to 3575.

BRIEF DESCRIPTION OF DRAWINGS

FIG. 1 shows size exclusion chromatogram (SEC) of CH$_3$O—(CH$_2$CH$_2$O)$_n$CH$_2$PhCH$_2$Cl (1).

FIG. 2 shows proton nuclear magnetic resonance spectrum ($^1$H-NMR) of CH$_3$O—(CH$_2$CH$_2$O)$_n$CH$_2$PhCH$_2$Cl (1).

FIG. 3 shows matrix-assisted laser desorption/ionization mass spectrometry (MALDI-TOF-MS) spectrum of CH$_3$O—(CH$_2$CH$_2$O)$_n$CH$_2$PhCH$_2$Cl (1).

FIG. 4 shows size exclusion chromatogram (SEC) of CH$_3$O—(CH$_2$CH$_2$O)$_n$CH$_2$PhCH$_2$Br (2).

FIG. 5 shows proton nuclear magnetic resonance spectrum ($^1$H-NMR) of CH$_3$O—(CH$_2$CH$_2$O)$_n$CH$_2$PhCH$_2$Br (2).

FIG. 6 shows matrix-assisted laser desorption/ionization mass spectrometry (MALDI-TOF-MS) spectrum of CH$_3$O—(CH$_2$CH$_2$O)$_n$CH$_2$PhCH$_2$Br (2).

FIG. 7 shows proton nuclear magnetic resonance spectrum ($^1$H-NMR) of (CH$_3$CH$_2$O)$_2$CHCH$_2$CH$_2$O—(CH$_2$CH$_2$O)$_n$CH$_2$PhCH$_2$Cl (3).

FIG. 8 shows proton nuclear magnetic resonance spectrum ($^1$H-NMR) of CH$_3$O—(CH$_2$CH$_2$O)$_n$CH$_2$PhCH$_2$SC(=S)Ph (4).

FIG. 9 shows matrix-assisted laser desorption/ionization mass spectrometry (MALDI-TOF-MS) spectrum of CH$_3$O—(CH$_2$CH$_2$O)$_n$CH$_2$PhCH$_2$SC(=S)Ph (4).

FIG. 10 shows proton nuclear magnetic resonance spectrum ($^1$H-NMR) of (CH$_3$CH$_2$O)$_2$CHCH$_2$CH$_2$O—(CH$_2$CH$_2$O)$_n$CH$_2$PhCH$_2$SC(=S)Ph (5).

FIG. 11 shows proton nuclear magnetic resonance spectrum ($^1$H-NMR) of CH$_3$O—(CH$_2$CH$_2$O)$_n$CH$_2$PhCH$_2$(CH$_2$CH(PhCH$_2$Cl))$_m$SC(=S)Ph (6).

FIG. 12 shows proton nuclear magnetic resonance spectrum ($^1$H-NMR) of CH$_3$O—(CH$_2$CH$_2$O)$_n$CH$_2$PhCH$_2$(CH$_2$CH(PhCH$_2$NH-TEMPO))$_m$SC(=S)Ph (7) (after adding and reducing hydrazine).

FIG. 13 shows proton nuclear magnetic resonance spectrum ($^1$H-NMR) of $CH_3O-(CH_2CH_2O)_nCH_2PhCH_2(CH_2CH(PhCH_2O\text{-}TEMPO))_mSC(=S)Ph$ (8) (after adding and reducing hydrazine).

FIG. 14 shows dynamic light scattering (DLS) spectrum of newRNP$^N$ (m=13).

FIG. 15 shows electron spin resonance spectrum of newRNP$^N$ (m=13).

FIG. 16 shows changes over time in concentration in blood following oral administration of newRNP$^N$ (m=30) and newRNP$^O$ (m=30).

FIG. 17 shows prothrombin time for oral administration of newRNP$^N$ (in =13).

FIG. 18 shows superoxide dismutase (SOD) production for oral administration of newRNP$^N$ (m 13).

FIG. 19 shows albumin production for oral administration of newRNP$^N$ (m=13).

FIG. 20 shows aspartate aminotransferase (AST) production for oral administration of newRNP$^N$ (m=13).

FIG. 21 shows alanine transaminase (ALT) production for oral administration of newRNP$^N$ (m=13).

FIG. 22 shows alkali phosphatase (ALP) production for oral administration of newRNP$^N$ (m 13).

FIG. 23 shows changes in blood concentration following intravenous injection of newRNP$^N$ and newRNP$^O$.

FIG. 24 shows proton nuclear magnetic resonance spectrum ($^1$H-NMR) of $CH_3O-(CH_2CH_2O)_nCH_2PhCH_2(CH_2CH(PhCH_2P(=O)(OCH_2CH_3)_2))_mSC(=S)Ph$ (9).

FIG. 25 shows proton nuclear magnetic resonance spectrum ($^1$H-NMR) of $CH_3O-(CH_2CH_2O)_nCH_2PhCH_2(CH_2CH(PhCH_2P(=O)(OH)_2))_mSC(=S)Ph$ (10).

FIG. 26 shows GPC chart of block copolymer (1) obtained in Example 1.

FIG. 27 shows size exclusion chromatogram (SEC) of 4,4,5,5-tetramethyl-1,3,2-dioxaboranophenylmethoxy-$(CH_2CH_2O)_nOH$ (Pre).

FIG. 28 shows proton nuclear magnetic resonance spectrum ($^1$H-NMR) of 4,4,5,5-tetramethyl-1,3,2-dioxaboranophenylmethoxy-$(CH_2CH_2O)_nOH$ (Pre).

FIG. 29 shows carbon nuclear magnetic resonance spectrum ($^{13}$C-NMR) of 4,4,5,5-tetramethyl-1,3,2-dioxaboranophenylmethoxy-$(CH_2CH_2O)_nOH$ (Pre).

WORKING EXAMPLES

The present invention will now be explained in greater detail.

Example 1: Synthesis of $CH_3O-(CH_2CH_2O)_nCH_2PhCH_2Cl$ (1)

(In the Formula, pH Denotes a Benzene Ring.)

50 g of a commercially available polyethylene glycol having a methoxy group at one terminal and a hydroxyl group at the other terminal ($CH_3O-(CH_2CH_2O)_nH$, molecular weight 5000, manufactured by Fluka Chemical Corp.), 200 mL of tetrahydrofuran and 10 mL of a commercially available butyl lithium (1.6 M, hexane solution) were added to a 500 mL flask, 25 g of a,a'-dichloro-p-xylylene ($ClCH_2PhCH_2Cl$) was added to the flask, and a reaction was allowed to progress at 60° C. for 24 hours. The reaction mixture liquid was precipitated in 500 mL of cold 2-propanol, and the precipitate was subjected to centrifugal separation (4° C., 9000 rpm, 2 minutes) and then to vacuum drying. A size exclusion chromatogram, NMR spectrum and MALDI-TOF spectrum of the thus obtained (1) are shown in FIGS. 1, 2 and 3. The quantity obtained was 50 g, and the yield was 97%. In addition, a gel permeation chromatograph (GPC) is shown in FIG. 26.

Example 2: Synthesis of $CH_3O-(CH_2CH_2O)_nCH_2PhCH_2Br$ (2)

Synthesis was carried out in the same way as in Example 1, except that a,a'-dibromo-p-xylylene ($BrCH_2PhCH_2Br$) was used instead of the a,a'-dichloro-p-xylylene. A size exclusion chromatogram, NMR spectrum and MALDI-TOF spectrum of the thus obtained (2) are shown in FIGS. 4, 5 and 6. The quantity obtained was 50 g, and the yield was 97%.

Example 3: Synthesis of $(CH_3CH_2O)_2CHCH_2CH_2O-(CH_2CH_2O)_nCH_2PhCH_2Cl$ (3)

100 mL of THF, commercially available 1,1-diethoxypropanol (0.9 g, 6 mmol) and potassium naphthalene (12 mL, 0.5 M) were added to a 500 mL flask to produce potassium 3,3-diethoxypropanoxide, after which 20 g (0.45 mol) of ethylene oxide was added and polymerization was allowed to progress at room temperature for 2 days. Following the polymerization, 25 g of a,a'-dichloro-p-xylylene ($ClCH_2PhCH_2Cl$) was added, and a reaction was allowed to progress at 60° C. for 24 hours. The reaction mixture liquid was precipitated in 500 mL of cold 2-propanol, and the precipitate was subjected to centrifugal separation (4° C., 9000 rpm, 2 minutes) and then to vacuum drying. A NMR spectrum of the thus obtained (3) is shown in FIG. 7. The quantity obtained was 20 g, and the yield was 95%.

Example 4: Synthesis of $CH_3O-(CH_2CH_2O)_nCH_2PhCH_2SC(=S)Ph$ (4)

50 mL of THF, 5 mL of commercially available carbon disulfide and 10 mL of bromophenyl magnesium (3M, THF solution) were added to a 100 mL flask to produce dithiobenzoate magnesium bromide ($PhC(=S)SMgBr$). 50 g of (1) synthesized in Example 1 and 200 mL of THF were added to a separate 500 mL flask, the obtained THF solution of dithiobenzoate magnesium bromide was added to the flask, and a reaction was allowed to progress at 40° C. for 24 hours. The reaction mixture liquid was precipitated in 500 mL of cold 2-propanol, and the precipitate was subjected to centrifugal separation (4° C., 9000 rpm, 2 minutes) and then to vacuum drying. NMR and MALDI-TOF mass spectra of the thus obtained (4) are shown in FIGS. 8 and 9. The quantity obtained was 50 g, and the yield was 97%.

Example 5: Synthesis of $(CH_3CH_2O)_2CHCH_2CH_2O-(CH_2CH_2O)_nCH_2PhCH_2SC(=S)Ph$ (5)

Synthesis of (5) was carried out in the same way as in Example 4, except that 20 g of (3) was used instead of (1). A NMR spectrum of the thus obtained (5) is shown in FIG. 10. The quantity obtained was 20 g, and the yield was 97%.

Example 6: Synthesis of $CH_3O-(CH_2CH_2O)_nCH_2PhCH_2(CH_2CH(PhCH_2Cl))_mSC(=S)Ph$ (6)

20 g of (4), 120 mg of azobisisobutyronitrile (AIBN), 60 mL of m,p-chloromethylstyrene (CMS) and 200 mL of toluene were added to a 500 mL flask, nitrogen gas was flushed for 3 minutes, and polymerization was then allowed to progress at 70° C. for 12 hours. The reaction mixture liquid was precipitated in 500 mL of cold 2-propanol, and the precipitate was subjected to centrifugal separation (4° C., 9000 rpm, 2 minutes) and then to vacuum drying. A NMR spectrum of the thus obtained (6) is shown in FIG. 11. The quantity obtained was 40 g. The degree of polymerization (m) of PCMS segments was 30.

Example 7: Synthesis (2) of $CH_3O—(CH_2CH_2O)_n$ $CH_2PhCH_2(CH_2CH(PhCH_2Cl))_mSC(=S)Ph$ (6)

Synthesis was carried out in the same way as in Example 6, except that 30 mL of CMS was used. The quantity obtained was 32 g. The degree of polymerization (m) of PCMS segments was 13.

Example 8: Synthesis (3) of $CH_3O—(CH_2CH_2O)_n$ $CH_2PhCH_2(CH_2CH(PhCH_2Cl))_mSC(=S)Ph$ (6)

Synthesis was carried out in the same way as in Example 6, except that 120 mL of CMS was used. The quantity obtained was 50 g. The degree of polymerization (m) of PCMS segments was 42.

Example 9: Synthesis of $CH_3O—(CH_2CH_2O)_n$ $CH_2PhCH_2(CH_2CH(PhCH_2NH\text{-}TEMPO))_mSC(=S)Ph$ (7)

(TEMPO is 2,2,6,6-tetramethylpiperidine-1-oxyl.)

10 g of (6) synthesized in Example 6, 100 mL of dimethylformamide (DMF) and 20 g of 4-amino-TEMPO were added to a 500 mL flask, and a reaction was allowed to progress at room temperature for 2 days. The reaction mixture liquid was precipitated in 500 mL of cold 2-propanol, and the precipitate was subjected to centrifugal separation (4° C., 9000 rpm, 2 minutes) and then to vacuum drying. A NMR spectrum of the thus obtained (7) is shown in FIG. 12. The quantity obtained was 10 g. The degree of TEMPO substitution was 80%.

Example 10: Synthesis (2) of $CH_3O—(CH_2CH_2O)_n$ $CH_2PhCH_2(CH_2CH(PhCH_2NH\text{-}TEMPO))_mSC(=S)Ph$ (7)

Synthesis was carried out in the same way as in Example 9, except that (6) synthesized in Example 7 was used instead of (6) synthesized in Example 6. The quantity obtained was 10 g. The degree of TEMPO substitution was 80%.

Example 11: Synthesis (3) of $CH_3O—(CH_2CH_2O)_n$ $CH_2PhCH_2(CH_2CH(PhCH_2NH\text{-}TEMPO))_mSC(=S)Ph$ (7)

Synthesis was carried out in the same way as in Example 9, except that (6) synthesized in Example 8 was used instead of (6) synthesized in Example 6. The quantity obtained was 10 g. The degree of TEMPO substitution was 80%.

Example 12: Synthesis of $CH_3O—(CH_2CH_2O)_n$ $CH_2PhCH_2(CH_2CH(PhCH_2O\text{-}TEMPO))_mSC(=S)Ph$ (8)

LiO-TEMPO was produced by adding 50 mL of THF, 10 g of 4-hydroxy-TEMPO and 40 mL of butyl lithium to a 200 mL flask and stirring. 10 g of (6) synthesized in Example 6, 100 mL of dimethylformamide (DMF) and the obtained LiO-TEMPO solution were added to a 500 mL flask, and a reaction was allowed to progress at room temperature for 2 days. The reaction mixture liquid was precipitated in 500 mL of cold 2-propanol, and the precipitate was subjected to centrifugal separation (4° C., 9000 rpm, 2 minutes) and then to vacuum drying. A NMR spectrum of the thus obtained (8) is shown in FIG. 13. The quantity obtained was 10 g. The degree of TEMPO substitution was 80%.

Example 13: Synthesis (2) of $CH_3O—(CH_2CH_2O)_n$ $CH_2PhCH_2(CH_2CH(PhCH_2O\text{-}TEMPO))_mSC(=S)Ph$ (8)

Synthesis was carried out in the same way as in Example 11, except that (6) synthesized in Example 7 was used instead of (6) synthesized in Example 6. The quantity obtained was 10 g. The degree of TEMPO substitution was 80%.

Example 14: Synthesis (3) of $CH_3O—(CH_2CH_2O)_n$ $CH_2PhCH_2(CH_2CH(PhCH_2O\text{-}TEMPO))_mSC(=S)Ph$ (8)

Synthesis was carried out in exactly the same way as in Example 11, except that (6) synthesized in Example 11 was used instead of (6) synthesized in Example 6. The quantity obtained was 10 g. The degree of TEMPO substitution was 80%.

Example 15: Preparation (1) of Redox Nanoparticles newRNP$^N$ that Disintegrate when the pH Decreases 10 g of (7) synthesized in Example 9 was placed in a glass container and dissolved in 400 mL of methanol, and the obtained solution was dialyzed (at 25 mg/mL) with 10 L of water using a hollow fiber type dialysis module having a molecular cutoff of 3000 (mPES Midikros (registered trademark), Modules 3 kD IC 0.5 mm D06-E003-05-N). A light scattering spectrum and electron spin resonance spectrum of the obtained particle solution are shown in FIGS. 14 and 15.

Example 16: Preparation (2) of Redox Nanoparticles newRNP$^N$ that Disintegrate when the pH Decreases Preparation was carried out in the same way as in Example 15, except that (7) synthesized in Example 10 was used instead of (7) synthesized in Example 9. (25 mg/mL)

Example 17: Preparation (3) of Redox Nanoparticles newRNP$^N$ that Disintegrate when the pH Decreases Preparation was carried out in the same way as in Example 15, except that (7) synthesized in Example 11 was used instead of (7) synthesized in Example 9. (25 mg/mL)

Example 18: Preparation (1) of Redox Nanoparticles newRNP$^O$ that do not Disintegrate when the pH Decreases Preparation was carried out in the same way as in Example 15, except that (8) synthesized in Example 12 was used instead of (7) synthesized in Example 9. (25 mg/mL)

Example 19: Preparation (2) of Redox Nanoparticles newRNP$^O$ that do not Disintegrate when the pH Decreases Preparation was carried out in the same way as in Example 15, except that (8) synthesized in Example 13 was used instead of (7) synthesized in Example 9. (25 mg/mL)

Example 20: Preparation (3) of Redox Nanoparticles newRNP$^O$ that do not Disintegrate when the pH Decreases Preparation was carried out in the same way as in Example 15, except that (8) synthesized in Example 14 was used instead of (7) synthesized in Example 9. (25 mg/mL)

Example 21: Preparation of Blank Micelles 1 g of the PEG-b-PCMS synthesized in Example 6 (m=30) was dissolved in 160 mL of methanol, and the thus obtained solution was dialyzed (at 6.25 mg/mL) with 10 L of water using a hollow fiber type dialysis module having a molecular cutoff of 3000 (mPES Midikros (registered trademark), Modules 3 kD IC 0.5 mm D06-E003-05-N).

Example 22: Blood Uptake Evaluation and Safety for Oral Administration of newRNP$^N$ newRNP$^N$ prepared in Example 9 (=30) was evaluated through oral administration.

newRNP$^N$ was administered in the manner described below to 10 week old IGS mice (5 mice per group) weighing 38 g to 41 g (during the period from arrival to completion of the test, the mice were reared at room temperature (23° C. (±1° C.)) and a humidity of 50% using a 12 hours light-12 hours dark cycle, and the mice ingested food and water freely).

Group 1: Free administration of water
Group 2: Aqueous solution of newRNP$^N$ forcibly administered intragastrically once per day using a feeding tube (day 1: 1 mL at 10 mg/mL, day 2 onwards: 1 mL at 20 mg/mL).
Group 3: 5 mg/mL aqueous solution of newRNP$^N$ freely ingested instead of water via a water feeding bottle.
Group 4: 10 mg/mL aqueous solution of newRNP$^N$ freely ingested instead of water via a water feeding bottle.
Group 5: 20 mg/mL aqueous solution of newRNP$^N$ freely ingested instead of water via a water feeding bottle.
Group 6: 20 mg/mL aqueous solution of newRNP$^O$ freely ingested instead of water via a water feeding bottle.

The quantities of water ingested by Group 1 and Groups 3 to 6 did not vary, as shown in Table 1.

TABLE 1

Comparison of quantities of water ingested

| Group | day 1 | 2 | 3 | 4 | 5 | 6 | 7 |
|---|---|---|---|---|---|---|---|
| 1 | 65 | 40 | 40 | 45 | 40 | 40 | 50 |
| 3 | 72.5 | 40 | 40 | 45 | 45 | 35 | 60 |
| 4 | 65 | 40 | 40 | 40 | 40 | 40 | 55 |
| 5 | 85 | 40 | 40 | 50 | 50 | 50 | 55 |
| 6 | 80 | 40 | 40 | 40 | 45 | 45 | 55 |

Note 1:
Quantity of water ingested for cage of 5 mice (mL/d/cage)

When uptake into the blood was investigated by means of electron spin resonance spectra, it was confirmed that newRNP$^O$ was not taken up into the blood at all by administration group 6. However, the in-blood concentration increased up to day 4 and reached a constant level in group 3, in which forcible administration was carried out using a feeding tube. In the free ingestion groups, a tendency was seen for the in-blood concentration to increase in a concentration-dependent manner, and in the 10 mg/mL or higher groups, the same level as the forcible administration group was reached after 6 days (see FIG. 16).

Example 23: Effect on Acetaminophen-Induced Hepatotoxicity newRNP$^N$ prepared in Example 16 (m=13) was evaluated through oral administration.

newRNP$^N$ was administered in the manner described below to 10 week old IGS mice (6 mice per group) weighing 38 g to g (during the period from arrival to completion of the test, the mice were reared at room temperature (23° C. (±1° C.)) and a humidity of 50% using a 112 hours light-112 hours dark cycle, and the mice ingested food and water freely).

Group 1: Untreated control (4 mice in this group only)
Group 2: 3 mg/kg of acetaminophen administered orally on the 7th day from the start of the test
Group 3: 1 mL of the blank micelles (6.25 mg/mL, 160 mg/kg) synthesized in Example 21 forcibly administered once per day via a feeding tube, 3 m g/kg of acetaminophen administered orally on the 7th day from the start of the test.
Group 4: 1 mL of newRNP$^N$ (6.25 mg/mL, 160 mg/kg) synthesized in Example 16 (m=13) forcibly administered once per day via a feeding tube, 3 mg/kg of acetaminophen administered orally on the 7th day from the start of the test.
Group 5: 170 mg/kg of 4-amino-TEMPO forcibly administered once per day via a feeding tube, 3 mg/kg of acetaminophen administered orally on the 7th day from the start of the test.
Group 6: 600 mg/kg of acetylcysteine forcibly administered once per day via a feeding tube, 3 mg/kg of acetaminophen administered orally on the 7th day from the start of the test.

The numbers of mice alive before and after administration of acetaminophen under these test conditions are shown in Table 2. When 3 mg/kg of acetaminophen was administered to IGS mice, the hepatopathic effect was too high, and two thirds of the mice died within 1 day (group 2). A similar tendency was seen with blank micelles (group 3), 4-amino-TEMPO (group 5) and acetylcysteine (group 6). With newRNP$^N$, however, all the mice survived (group 4).

TABLE 2

Numbers of mice alive before and after administration of acetaminophen

| Group | Before test | After test |
|---|---|---|
| 1 | 4 | 4 |
| 2 | 6 | 2 |
| 3 | 6 | 3 |
| 4 | 6 | 6 |
| 5 | 6 | 2 |
| 6 | 6 | 4 |

Prothrombin time, which is an indicator of hepatic function, was found to be extended for 4-amino-TEMPO and acetylcysteine, but was the same level as the control group for the newRNP$^N$ group (see FIG. 17). When superoxide dismutase (SOD) production was quantitatively determined, a significant decrease was observed in the acetaminophen administration group and other drug administration groups, but was the same level as the control group for the newRNP$^N$ group (see FIG. 18).

When the albumin quantity, which is an indicator of hepatic function, and AST, ALT and ALP enzyme levels were measured, low molecular weight 4-amino-TEMPO exhibited extremely high toxicity, but newRNP$^N$ exhibited extremely low hepatotoxicity (see FIGS. 19 to 22).

Therefore, the newRNP$^N$ of the present invention did not exhibit hepatotoxicity and exhibited suppression of acetaminophen-induced hepatopathy.

Example 24: Retention of newRNP$^N$ and newRNP$^O$ in Blood newRNP$^N$ and newRNP$^O$ produced in Examples 15 to 20 were administered intravenously, and evaluated in terms of retention in blood. Retention of newRNP$^N$ and newRNP$^O$ in blood was evaluated in the manner described below in 10 week old IGS mice (5 mice per group) weighing 38 g to 41 g (during the period from arrival to completion of the test, the mice were reared at room temperature (23° C. (±1° C.)) and a humidity of 50% using a 12 hours light-12 hours dark cycle, and the mice ingested food and water freely).

Group 1: 4-amino-TEMPO (200 μL was administered intravenously at 10 mg/mL into the tail, 50 mg/kg)
Group 2: newRNP$^N$ (200 μL of a sample obtained in Example 15 (m=30) was administered intravenously at 25 mg/mL into the tail, 125 mg/kg)
Group 3: newRNP$^N$ (200 μL of a sample obtained in Example 16 (m=13) was administered intravenously at 25 mg/mL into the tail, 125 mg/kg)
Group 4: newRNP$^N$ (a sample obtained in Example 17 (m=42) was concentrated to 50 mg/mL, and 200 μL was then administered intravenously into the tail, 250 mg/kg)
Group 5: newRNP$^O$ (a sample obtained in Example 18 (m=30) was concentrated to 50 mg/mL, and 250 μL was then administered intravenously into the tail, 312.5 mg/kg)
Group 6: newRNP$^O$ (a sample obtained in Example 19 (m=13) was concentrated to 50 mg/mL, and 200 μL was then administered intravenously into the tail, 250 m g/kg)
Group 7: newRNP$^O$ (a sample obtained in Example 20 (m 42) was concentrated to 50 mg/mL, and 200 μL was then administered intravenously into the tail, 250 mg/kg)

Blood was sampled 5 minutes, 15 minutes, 30 minutes, 1 hour, 4 hours, 12 hours, 24 hours, 48 hours, 72 hours and 96 hours after administration and subjected to centrifugal separation, after which potassium ferricyanide was added to the supernatant liquid, and quantitative determination was carried out using an X band electron spin resonance apparatus.

FIG. 23 shows changes in the concentration of RNP in blood. For ease of understanding, data from Test Example 4 in WO 2009/133647 has been added as comparative data to FIG. 23. As shown in the diagram, newRNP produced in the present invention does not contain an ABA type block copolymer, unlike conventional RNPs, meaning that retention in blood was significantly improved. In particular, it was confirmed that newRNP$^O$ was retained for 4 days or longer following intravenous administration.

Example 25: Synthesis of CH$_3$O—(CH$_2$CH$_2$O)$_n$ CH$_2$PhCH$_2$(CH$_2$CH(PhCH$_2$P(=O)(OCH$_2$CH$_3$)$_2$)) $_m$SC(=S)Ph (9)

LiP(=O)(OCH$_2$CH$_3$)$_2$ was prepared by adding 20 mL of THF, 1.3 g of diethyl phosphite and 6.5 mL (10 mmol) of butyl lithium to a 200 mL flask and stirring. 3 g of (6) synthesized in Example 6, 50 mL of dimethylformamide (DMF) and the thus prepared LiP(=O)(OCH$_2$CH$_3$)$_2$ solution were added to a 500 mL flask, and a reaction was allowed to progress at room temperature for 2 days. The reaction mixture liquid was precipitated in 500 mL of cold 2-propanol, and the precipitate was subjected to centrifugal separation (4° C., 9000 rpm, 2 minutes) and then to vacuum drying. A NMR spectrum of the thus obtained (9) is shown in FIG. 24. The quantity obtained was 3 g. The degree of diethyl phosphate substitution was 80%.

Example 26: Synthesis of CH$_3$O—(CH$_2$CH$_2$O)$_n$ CH$_2$PhCH$_2$(CH$_2$CH(PhCH$_2$P(=O)(OH)$_2$))$_m$SC (=S)Ph (10)

20 mL of CHCl$_3$, 2 g of (9) and 2 m of trimethylsilyl bromide were added to a 100 mL flask, a reaction was allowed to progress at 45° C. for 2 hours, after which the chloroform was distilled off, 80 mL of methanol was added, and a reaction was allowed to progress at room temperature for 15 hours. The solution was dialyzed with water and then vacuum dried. A NMR spectrum of the thus obtained (10) is shown in FIG. 25. The quantity obtained was 1.5 g. The degree of diethyl phosphate hydrolysis was 90%.

Example 27: Synthesis of 4,4,5,5-tetramethyl-1,3,2-dioxaboranophenylmethoxy-(CH$_2$CH$_2$O)$_n$OH (Pre)

50 mL of THF, 1.67 g (7.1 mmol) of commercially available 2-(4-hydroxymethylphenyl)-4,4,5,5-tetramethyl-1,3,2-dioxaborane and potassium naphthalene (8.0 mL, 0.9 M) were added to a 100 mL flask to produce a potassium alcoholate of 2-(4-hydroxymethylphenyl)-4,4,5,5-tetramethyl-1,3,2-dioxaborane, after which 31 g (0.7 mol) of ethylene oxide was added, and polymerization was carried out at room temperature for 2 days. Following the polymerization, the reaction mixture liquid was precipitated in 700 mL of cold 2-propanol, and the precipitate was subjected to centrifugal separation (4° C., 9000 rpm, 2 minutes) and then to vacuum drying. SEC, $^1$H-NMR and $^{13}$C-NMR spectra of the obtained (Pre) are shown in FIGS. 27, 28 and 29. The quantity obtained was 28 g, and the yield was 90%.

The invention claimed is:
1. A block copolymer of the following formula (W):

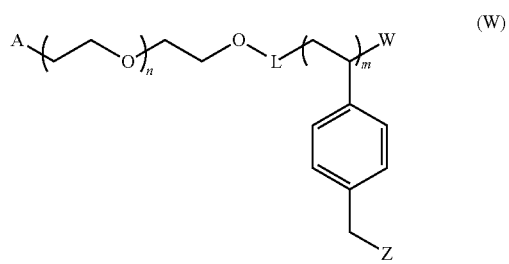

wherein,
W denotes the formula

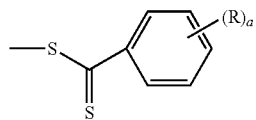

or a hydrogen atom or a mercapto group,

A denotes an unsubstituted or substituted $C_1$-$C_{12}$ alkoxy group, with the substituent group being a formyl group or a group represented by the formula $R_1R_2CH-$ in cases where A is substituted, $R_1$ and $R_2$ each independently denote a $C_1$-$C_4$ alkoxy group or $R_1$ and $R_2$ together denote a —$OCH_2CH_2O$— group, a —$O(CH_2)_3O$— group or a —$O(CH_2)_4O$— group, or in cases where A is substituted, the substituent group is a group represented by the formula $R_3R_4B$-Ph-, where $R_3$ and $R_4$ each denote a hydroxy group or $R_3$ and $R_4$ together denote a —$OC(CH_3)_2C(CH_3)_2O$— group, and Ph denotes an o-phenylene group, m-phenylene group or p-phenylene group that may be substituted by a methyl group or methoxy group, L is m-xylylene or p-xylylene, R groups each independently denote a methyl group or methoxy group, a is an integer between 0 and 3, m is an integer between 3 and 500, n is an integer between 2 and 10,000, Z is selected from groups represented by the formulae below, which are covalently bonded via a —NH— group or —O— group:

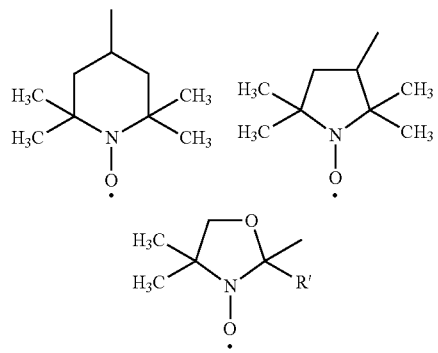

or denotes a —$P(=O)(OCH_2CH_3)_2$ group or —$P(=O)(OH)_2$ group, with these groups accounting for at least 60% of the total number of Z groups, and the remaining Z groups, when present, being chlorine atoms, bromine atoms, iodine atoms or hydroxyl groups.

2. The block copolymer of claim 1, wherein the phenyldithiocarbonyl group in formula (W), which may be substituted by $(R)_a$, is present in an unmodified form.

3. The block copolymer of claim 1, wherein

Z is selected from groups represented by the formulae below, which are covalently bonded via a —NH— group or —O— group

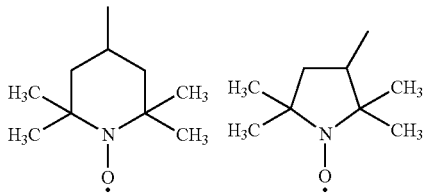

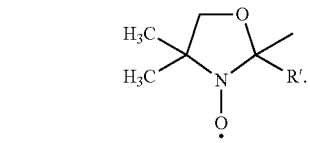

4. The block copolymer of claim 1, wherein Z denotes a —$P(=O)(OCH_2CH_3)_2$ group or a —$P(=O)(OH)_2$ group.

\* \* \* \* \*